United States Patent
Smith

(10) Patent No.: US 12,002,297 B1
(45) Date of Patent: Jun. 4, 2024

(54) SYSTEM AND METHOD FOR RELIABLE OPINION POLLS

(71) Applicant: David Lane Smith, Bryan, TX (US)

(72) Inventor: David Lane Smith, Bryan, TX (US)

(*) Notice: Subject to any disclaimer, the term of this patent is extended or adjusted under 35 U.S.C. 154(b) by 0 days.

(21) Appl. No.: 17/866,536

(22) Filed: Jul. 17, 2022

Related U.S. Application Data

(63) Continuation-in-part of application No. 17/221,782, filed on Apr. 3, 2021.

(60) Provisional application No. 63/223,036, filed on Jul. 18, 2021, provisional application No. 63/005,242, filed on Apr. 4, 2020.

(51) Int. Cl.

| | |
|---|---|
| *G06Q 20/38* | (2012.01) |
| *G06Q 50/26* | (2012.01) |
| *G07C 13/00* | (2006.01) |
| *H04L 9/08* | (2006.01) |
| *H04L 9/32* | (2006.01) |

(52) U.S. Cl.
CPC ............ *G07C 13/00* (2013.01); *G06Q 50/26* (2013.01); *H04L 9/0825* (2013.01); *H04L 9/3247* (2013.01); *G06Q 2230/00* (2013.01); *H04L 2209/463* (2013.01)

(58) Field of Classification Search
CPC .................................................. G06Q 50/26
USPC .......................................................... 705/12
See application file for complete search history.

(56) References Cited

U.S. PATENT DOCUMENTS

| | | | |
|---|---|---|---|
| 4,759,063 A | 7/1988 | Chaum | |
| 6,540,138 B2 | 4/2003 | Hall et al. | |
| 6,688,517 B1 | 2/2004 | McClure et al. | |
| 6,826,540 B1 * | 11/2004 | Plantec | G09B 7/00 |
| | | | 715/706 |
| 7,260,552 B2 | 8/2007 | Jorba et al. | |
| 7,640,181 B2 * | 12/2009 | McClure | G07C 13/00 |
| | | | 705/12 |
| 7,729,991 B2 | 6/2010 | Rodriguez et al. | |
| 9,740,543 B1 * | 8/2017 | Savage | G06F 9/4486 |
| 9,985,936 B2 | 5/2018 | Dare et al. | |
| 2006/0000904 A1 * | 1/2006 | Vernay | H04L 9/3263 |
| | | | 705/12 |
| 2007/0192607 A1 | 8/2007 | Canard et al. | |

(Continued)

FOREIGN PATENT DOCUMENTS

CN 107294727 B 10/2017

OTHER PUBLICATIONS

Fujioka, et. al., A practical secret voting scheme for large scale elections, Advances in Cryptology—AUSCRYPT '92. AUSCRYPT 1992, Lecture Notes in Computer Science, vol. 718, https://doi.org/10.1007/3-540-57220-1_66, https://link.springer.com/chapter/10.1007/3-540-57220-1_66.

(Continued)

*Primary Examiner* — Chinedu C Agwumezie

(57) ABSTRACT

A system and method of reliable polling of an authenticated population of participants using network connected computing devices for the purpose of collecting and reporting verifiable opinions in an election, including, but not limited to, granting participants the right to participate in the election, collecting answers to one or more ballot questions from authenticated participants, using blinded authorization to submit participant answers to ballot questions, and accumulating and reporting the answers to the one or more ballot questions.

24 Claims, 8 Drawing Sheets

(56) References Cited

U.S. PATENT DOCUMENTS

2010/0121765 A1* 5/2010 Ahrens .................. G07C 13/00
                                                                705/50
2017/0109955 A1* 4/2017 Ernest .................... G07C 13/00

OTHER PUBLICATIONS

Benaloh, et. al., Receipt-free secret-ballot elections, STOC '94: Proceedings of the twenty-sixth annual ACM symposium on Theory of Computing, May 1994, pp. 544-553, https://doi.org/10.1145/195058.195407, https://dl.acm.org/doi/10.1145/195058.195407, https://www.microsoft.com/en-us/research/publication/receipt-free-secret-ballot-elections/.

Jonker, et. al., Formalising Receipt-Freeness, Information Security, 9th International Conference, ISC 2006, Aug. 2006, pp. 476-488, https://www.researchgate.net/publication/220905369_Formalising_Receipt-Freeness.

Moran, et. al., Receipt-Free Universally-Verifiable Voting with Everlasting Privacy, CRYPTO 2006: Advances in Cryptology, CRYPTO 2006, pp. 373-392, https://doi.org/10.1007/11818175_22, https://www.wisdom.weizmann.ac.il/~naor/PAPERS/vote_everlasting.pdf.

Bernahrd, et. al., Public Evidence from Secret Ballots. International Joint Conference on Electronic Voting, 2017, https://api.semanticscholar.org/CorpusID:34871552, https://arxiv.org/pdf/1707.08619.pdf2017, https://www.microsoft.com/en-us/research/publication/public-evidence-from-secret-ballots/.

* cited by examiner

SYSTEM AND METHOD FOR RELIABLE OPINION POLLS

RELATED APPLICATION

This application claims the priority of U.S. Provisional 63/223,036, filed on Jul. 18, 2021 and entitled "SYSTEM AND METHOD FOR RELIABLE OPINION POLLS", and is a continuation-in-part of U.S. patent application Ser. No. 17/221,782, filed on Apr. 3, 2021 and entitled "SYSTEM AND METHOD FOR RELIABLE OPINION POLLS", which claims the priority of U.S. Provisional 63/005,242, filed on Apr. 4, 2020 and entitled "SYSTEM AND METHOD FOR REAL TIME OPINION SURVEYS", all of which are hereby incorporated by reference in their entirety.

TECHNICAL FIELD

This invention relates to a polling system and method to collect and report verifiable opinions from an authenticated population of participants using network connected computing devices.

BACKGROUND

Traditional opinion polling organizations poll only a few thousand people and attempt to predict the thoughts of millions of people in a geographic or political region. Methodologies used in these traditional polling organizations were developed in the early part of the $20^{th}$ century when it was economically and practically infeasible to gather the opinion of large numbers of people. In these early survey methodologies, opinion polls were gathered by individually interviewing about one thousand people and were primarily used to predict election results. Using election results as a point of reference, opinion polling methodologies were refined in the hope that a survey of a small number of people could accurately predict the outcome of an election. Over the years, the accuracy of these types of opinion polls has varied greatly. These survey methodologies can be useful but their reliance on "normalization" of survey populations based on geography and other characteristics can lead to inexact results. These methodologies tend to gloss over differences in sub-populations of the population that are sampled. Further, these methodologies do not facilitate truly anonymous expression of opinion, do not have safeguards to ensure accurate results, and/or are subject to misuse.

Reliable Opinion Polls are not limited to sample-style polling. In many jurisdictions, the central premise of governance is expressed by ascertaining the will of the people. In some cases, the will of the people directly determines policy. In other cases, the people select representatives who in turn determine policy. In both cases, people participate in elections in which everyone who is qualified to participate in the election may express their will using a balloting process. This balloting process allows qualified voters to express their opinions on policy or preference for a representative. Ballots are counted and ultimately the policy or representative with the most votes is selected. This type of governance by election is not limited to governments but applies equally to governance for entities such as public and private corporations, non-profits, NGOs, and other organizations. Fair and open elections are critical to the well being of this type of governance. Today's solutions are based on paper methods or essentially electronic implementation of paper methods. Many of the electronic solutions rely on hidden methods and closed source code that are difficult if not impossible to audit. One embodiment of Reliable Opinion Polls is elections.

With the advent of widespread adoption of desktop and handheld computing devices that are connected to the Internet, a much-improved form of opinion polling is made possible using the innovations disclosed herein. Using these connected computing devices, opinions may be collected from a large population with the results being reported in substantially real-time. Voting participants can be limited to those with particular qualifications such as those that are currently registered to vote or those that are authenticated members of an organizational unit. Voting participants can only submit their opinion a single time for each question ask. Voting participant responses may be anonymized resulting in reliable secret opinion polls and elections. Opinion polls can be configured so that no one can except the voting participant can know the response submitted by the voting participant. The identity of a participant and their qualifications to participate can be verified by an auditing authority without revealing the responses of the participant. Opinion polls may be configured to allow an auditing authority to ascertain the validity and accuracy of a voting participant's response. A voting participant's response cannot be duplicated or changed without detection. In many instances, a duplicate or forged response can be detected and removed from the collective survey results without damaging the integrity of the opinion poll. Voting participants can be assured that their opinion was collected, reported, and tallied correctly. Anyone can validate that all voting participant responses have been tallied correctly. In some embodiments, voting participants can participate in the validation of the opinion poll by providing information that will lead to the validation of their particular response. Observers have access to substantially real-time tallies of voting participant opinions. Observers can broadcast or publish the tallies of voting participant opinions. Auditors can perform an audit of the responses to an opinion poll.

Opinion polls can contain multiple questions that use simple or complex branching logic to determine the questions to be ask. After an opinion poll is published, the system will accept responses for the opinion poll during one or more specified periods of time. An opinion poll for which the system is accepting responses is known as an "open" or "active" opinion poll. Voting participants may respond to currently open opinion polls at their convenience. Opinion polls may collect interactive responses and opinions during live or recorded events. Since computing devices are used to collect opinions, the voting participant can use computing devices to take full advantage of cryptographic privacy, security, and digital witness methodologies that lead to reliable, auditable, and anonymous opinion polls of large populations of participants with results reported in substantially real-time in the aggregate and by geographic, governmental, organizational, political, or other characteristics.

Opinion polls are comprised of a variety of direct or implied questions such as questions that provide specific possible responses, questions that allow a free-form text response, responses with implied or no question such as forum and/or social media type comments and media, responses comprised of candid reporting of facts and events by journalists, and responses configured for the disclosure of information such as DNA, medical, or other personal information by authenticated but anonymous participants.

Reliable Opinion Polls as disclosed herein are a dramatic improvement over the methodologies previously developed. Reliable Opinion Polling protocols provide a substantial improvement in the level of privacy, reliability, security, and auditability over current polling systems. Additionally, Reliable Opinion Polls as disclosed herein may function as elections and substantially outperform existing election systems. True secret ballot electronic voting systems have proven to be a deceptively difficult problem to solve. In fact, although many systems have been proposed for elections with verifiable secret ballot electronic voting, none of those systems are in common use today. Reliable Secret Polling proposes to deliver the benefits of secret balloting and anonymous responses as an election system while dramatically improving reliability and auditability as compared to traditional paper-based election systems. These and other benefits disclosed herein combine together to create entirely new classes of solutions.

Unless specifically stated as such, the preceding is not admitted to be prior art and no statement appearing in this section should be interpreted as a disclaimer of any features or improvements listed.

BRIEF DESCRIPTION OF THE INVENTION

Various embodiments of a system and method for Reliable Opinion Polls also known as Reliable Secret Polls are disclosed herein.

An opinion poll can be broadly defined as a method for collecting information about the opinions of a given group of people. An opinion poll can collect opinions for purposes such as a) gathering insight into the views and beliefs of a group of people or b) selecting candidates for an office or policies in an election. An opinion poll disclosed herein may include features such as a) authenticating participants to determine whether or not to include the participant in the population to be polled based on voter registration status in a jurisdiction or their membership in a specified group, b) asking one or more questions of the authenticated participants or asking authenticated participants to make one or more choices from a list of options or candidates, c) anonymizing, collecting, and totaling the answers to one or more questions or choices, d) auditing the responses, and e) reporting the accumulated totals in substantially real-time and/or after all responses are have been received. Optionally, an opinion poll may also include a) analyzing responses for bias and applying statistical corrections, b) reporting responses in subgroups based on characteristics of participants, and c) delivering reported results to participants. Voting participants use client devices that are networked computing devices such as smart phones, tablets, desktop computers, and notebook computers to connect to servers and/or service applications to accomplish participation in an opinion poll. In general, servers and/or application services include functions such as a) receive a request to grant a participant the right to participate in an opinion poll, b) receive and validate at least one participant credential issued by at least one jurisdiction or other selected group authority in order to validate the participant identity, c) confirm that the participant has been granted the right to participate i) as a voter in an election held within a jurisdiction or ii) as a member of a selected group, thereby granting the participant the right to express an opinion in response to the poll, d) send at least one question or choice via a client to one or more participants to be polled, e) participate with a client to record an anonymized response to at least one question or choice from one or more participants, f) accumulate and report a total of the answers from one or more participants, and g) audit the process and responses for accuracy, completeness, and correctness. In general, client and/or client applications include functions such as a) collect at least one credential issued by at least one jurisdiction or other selected group authority that validates participant identity, b) send a request to at least one server to grant the participant the right to participate in at least one opinion poll, c) receive confirmation that the participant has been granted the right to participate in at least one opinion poll, d) receive one or more questions or choices from at least one server, e) present the questions or choices to the participant and collect participant opinions as answers into responses, and f) participate with a service to record an anonymized response. Optionally, client and/or client applications may include functionality to allow a participate to contribute suggestions, questions, choices, links, events, or other content that is sent to a server and collected for possible use in future opinion polls.

At least one embodiment described herein provides a system and method for reliable opinion polls comprised of personal computing devices such as mobile and desktop devices and server computing devices such as virtual and physical computer servers on which are executed computing instructions that orchestrate a process with a number of features that implement opinion polls such as a) voting participants are individuals or entities that are authorized to express opinions on an opinion poll, b) voting participants are issued digital credentials that allow for participation in opinion polls, c) opinion polls are presented to voting participants and their opinions are collected on a computing device, d) voting participants present digital credentials to an authenticator service executing on a server and are given a one-time voting ticket allowing the voting participants to submit their responses to an opinion poll, e) responses to an opinion poll are anonymous and not associated with a particular voting participant, f) voting participant responses are authenticated and tallied, g) tallied results are presented in substantially real-time, presented after the opinion poll has closed or window of time when responses may be submitted has completed, and/or presented after the tallied results have been audited, h) voting participant digital credentials are assigned a random number identifier, i) authorized and impartial third-party voting participant information auditors may periodically open and review the public portion of voting participant information for the purpose of providing public assurance that voting participants are valid and eligible to vote, j) voting participants can record and submit their responses and opinions to one or more questions included in an opinion poll, k) voting participants can provide multiple answers to an opinion poll during the lifetime of an event such that tallied results trend during the event as a function of time, l) voting participants can be assured that responses have been recorded and tallied correctly, m) anyone can validate that all of the responses have been tallied correctly and have not been subject to tampering, and n) audited results may be published and can trigger additional recounts, audits, or certifications of the tallied results.

At least one embodiment described herein provides a system and method for reliable opinion polls in which voting participants derive their authority to provide responses in the system by virtue of their current and approved voter registration status from a governmental jurisdiction. Responses from voting participants may be tallied according to governmental jurisdiction and subdivisions within such a governmental jurisdiction. At least one embodiment described herein provides a system and method for reliable opinion polls in which a voting participant must be a current, approved, and valid registered voter within a state or territory of the United States in order to provide an opinion or response to an opinion poll directed to a population of the United States. At least one embodiment described herein provides a system and method for reliable opinion polls in which voting participants derive their authority to provide opinion responses by virtue of their current and approved membership in a group, organization, governmental jurisdiction, or other jurisdiction.

At least one embodiment described herein provides an election system and method in which voting participants derive their authority to cast a vote for a candidate for office by virtue of their current and approved voter registration status from a governmental jurisdiction. Responses from voting participants are tallied according to governmental jurisdiction and subdivisions within such a governmental jurisdiction to choose a policy or a candidate for office. Such an embodiment of an election system may replace or act in coordination with a physical ballot casting and auditing system. In this embodiment, application servers and application services are operated at an election voting location and/or remotely in service to one or more election voting locations. Voters may be validated as authorized registered voters as described in the onboarding process or may be validated in an external system that provides an indication of authentication that allows the onboarding of a voting participant via individual or group membership as described herein. Voters may use a personal computing device, a shared computing device, or a special-purpose shared voting station device on which to provide their authenticated response to an election ballot. The general protocols described herein are followed to allow the voter to cast a vote. Both local and remote application services may participate in the protocols. All data may be saved locally and/or remotely. Responses with anonymous authentication may be printed to allow the voter to verify their responses, allow independent scanning and input of voter responses, and provide a paper copy of responses to be used in an audit of the responses and results. Voting data collected at the local level may be merged with other voting data from other locations to create an aggregate of voting results in substantially real-time or after the election is closed to accepting responses. Local data for each voter may be printed and archived for further auditing. Voting tests may be performed at the local voting location to test the voting system for honest, complete, and correct operations.

At least one embodiment described herein provides a system and method for reliable opinion polls in which voting participants may provide a response with or without a specifically posed question. Such a response may be a free-form text response or may be a selected from pre-determined responses. Free-form text responses may be analyzed for trends, intentions, and/or specific content and results tallied and reported based on such analysis. Free-form text responses may or may not be published as individual responses. At least one embodiment described herein provides a system and method for reliable opinion polls in which voting participants may contribute suggested surveys, questions, answers, or other content that may be optionally published in an opinion poll.

At least one embodiment described herein includes a system and method that comprises response auditing in which a system component audits all stored results to provide assurance that all responses are present, correct, complete, and have been included in a tally. At least one embodiment described herein includes a system and method that disassociates the voting participant from their response to an opinion poll. By disassociating the voting participant from their response to an opinion poll, trusted and verified responses to an opinion poll can be publicly known and tallied in substantially real-time without disclosing identifiable information about the voting participant.

Voting participants use client devices that are networked computing devices such as smart phones, tablets, desktop computers, and notebook computers to connect to servers and/or service applications to accomplish participation in a poll. Participants can be limited to those with particular qualifications such as those that are currently registered to vote or those that are authenticated members of an organizational unit. An authenticated participant is issued digital credentials in the form of digital certificates.

Voting participants answer one or more survey questions in which they indicate one or more answers that may be choices from a list of answer options or election candidates. Voting participant responses are submitted and recorded in an anonymous response protocol. The voting participant is the only one that can know both their identity and their response. Voting participant characteristics may be submitted separately or in combination with participant responses. For non-interactive questions, voting participants can only express their opinion as a single answer for each question ask. For interactive questions, a voting participant can repeatedly express their opinions in regard to content on a timeline. Surveys can be configured so that an auditing authority can ascertain the validity and accuracy of a voting participant's opinion without revealing the identity of the voting participant. The identity of a voting participant and their qualifications to participate can be verified by an auditing authority without revealing the responses of the voting participant. A voting participant's response cannot be duplicated or changed without detection. Optionally, a duplicate or forged response can be detected and removed from the collective survey results without damaging the integrity of the survey. Optionally, test voting participants may submit test responses to facilitate an audit of system services and components in substantially real-time. Voting participants can be assured that their opinion was collected, reported, and tallied correctly. Responses can be tallied in substantially real-time and publicly reported. The responses can be reported in subgroups based on characteristics of voting participants. Characteristics of the voting participants can be tallied in substantially real-time and publicly reported. The characteristics of the voting participants can be reported in subgroups that correspond to response subgroups. Anyone can validate that all voting participant responses have been tallied correctly. After the survey is completed, internal and/or third-party auditors can perform an audit of the voting participants and responses to a survey and publish the results. Voting participants may contribute suggestions, questions, choices, links, events, or other content that is collected for possible use in future surveys. Observers have access to substantially real-time tallies of voting participant opinions. Observers can broadcast or publish the tallies of voting participant opinions.

These and other aspects of the disclosed subject matter, as well as additional novel features, will be apparent from the description provided herein. The intent of this summary is not to be a comprehensive description of the claimed subject matter, but rather to provide a short overview of some of the subject matter's functionality. Other systems, methods, features and advantages herein provided will become apparent to one with skill in the art upon examination of the following FIGS. and detailed description. It is intended that all such additional systems, methods, features and advantages that are included within this description, be within the scope of the claims.

BRIEF DESCRIPTION OF FIGURES

The features characteristic of the invention are set forth in the claims. However, the invention itself and further objectives and advantages thereof, will best be understood by reference to the following detailed description when read in conjunction with the accompanying drawings in which the left-most significant digit(s) in the reference numerals denote(s) the first figure in which the respective reference numerals appear, wherein:

DETAILED DESCRIPTION

Figure 1:
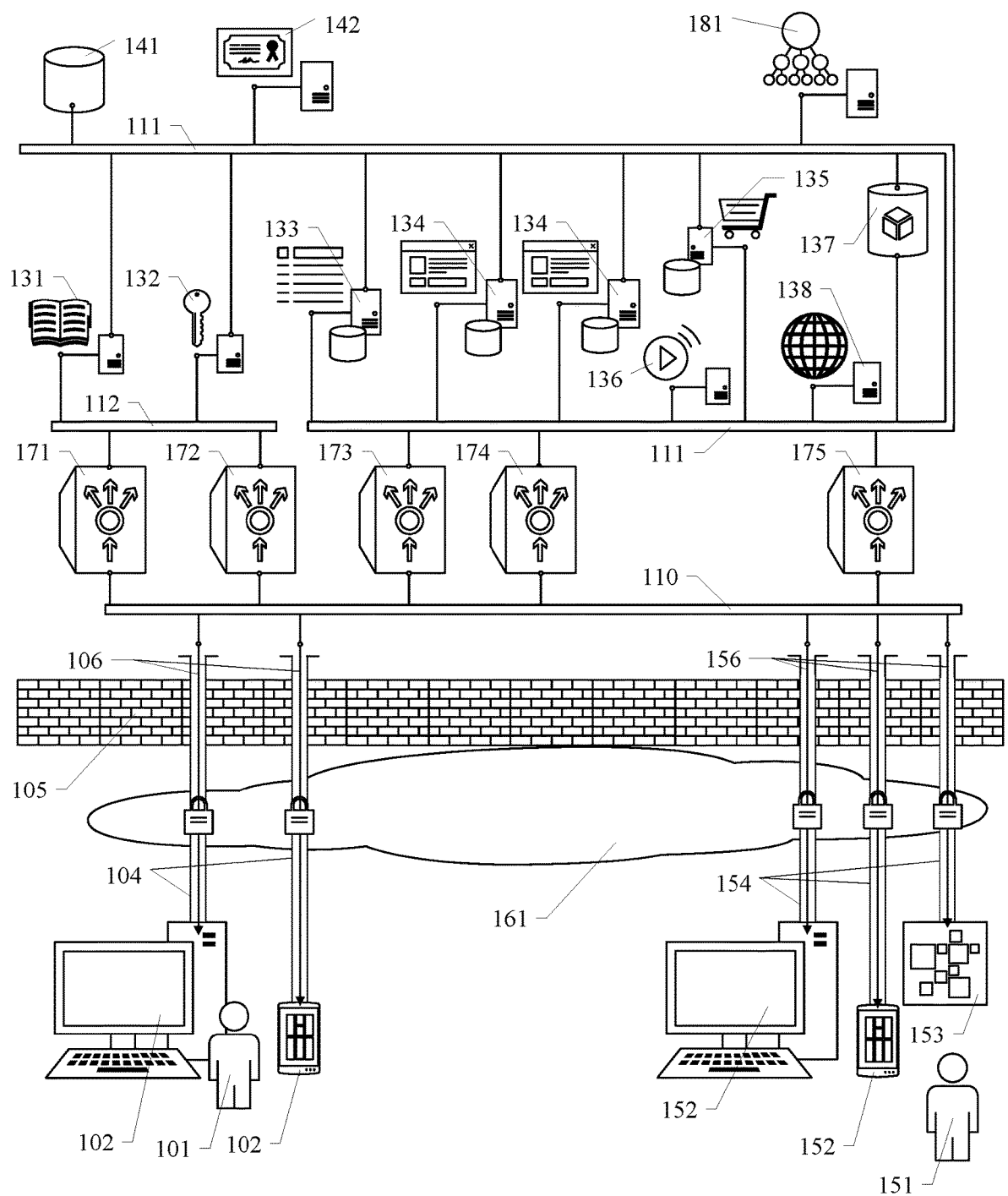
FIG. 1 shows an overall view of a system and method for reliable opinion polls according to an embodiment of the disclosed subject matter.

Although described with reference to certain embodiments, those with skill in the art will recognize that the disclosed embodiments have relevance to a wide variety of areas in addition to those specific examples described below. Further, elements from one or more embodiments may be used in other embodiments and elements may be removed from an embodiment and remain within the scope of this disclosure.

All references, including publications, patent applications, and patents, cited herein are hereby incorporated by reference to the same extent as if each reference were individually and specifically indicated to be incorporated by reference and were set forth in its entirety herein; provided, however, to the extent there exists a conflict between this disclosure and a document incorporated by reference, this disclosure shall control.

As referenced herein, the term "participant" is a person or entity that interacts with the system such as a voter, authorized voter, member, observer, auditor, partner, media partner, system administrator, or system user.

As referenced herein, the term "jurisdiction" refers to a political, governmental, geographic, public, private, business, NGO, and/or non-profit jurisdiction.

As referenced herein, the term "member" is a participant that has successfully completed an onboarding process and are thereby granted the right to participate within the system. Being a member or having membership may or may not require financial commitments. Being a member or having membership may or may not confer a responsibility or authority for governance with regards to the disclosed system. Being a member or having membership may or may not confer other advantages.

As referenced herein, the terms "voter", "voting participant", "survey participant", "polling participant", and "authorized voter" are used interchangeably and describe a member that has been authenticated and granted rights to express a response to an opinion poll within the context of one or more groups, institutions, organizations, governmental, and/or political units. A "test participant" is a voting participant that is identified by a certificate or attribute as a participant that is used only for response auditing.

As referenced herein, a response to an opinion poll may also be known as a "response", "vote", "viewpoint", "approval", "disapproval", "preference", "opinion", "observation", "comment", "statement", "voter response", "casting a vote", and/or "casting a ballot".

As referenced herein, collecting a response to an opinion poll may also be known as "surveying", "opinion surveying", "questioning", "voting", "polling", "holding an election", "survey" (verb), and/or "poll" (verb).

As referenced herein, the terms, used as a noun optionally modified by an adjective, "opinion poll", "survey", "opinion survey", and "poll" are used interchangeably and are comprised of zero or more implicit or explicit questions that are presented to a voting participant. Opinion polls are comprised of questions ("survey questions", "poll questions") that are posed to a voting participant in which the voting participant provides zero or more answers ("answers") to one or more survey questions. A response ("response") is a collection of answers to survey questions on a single opinion poll that are submitted as a group. A voting participant may submit one or more responses to an opinion poll. Some types of questions in an opinion poll allow only a single answer to a survey question. Other types of questions ("interactive question") in an opinion poll may allow multiple or repeated answers to one or more survey questions during the timeline of an in-person event, live broadcast or media stream of an event, and/or recorded media playback of an event. If an opinion poll includes one or more interactive questions, that opinion poll may also be described as "interactive," for example as an "interactive opinion poll." A response to an interactive opinion poll ("interactive response") is a collection of answers to survey questions and/or interactive questions that are submitted as a group. A voting participant may submit one or more interactive responses to an interactive opinion poll. An election ("election") is an opinion poll that comprises a collection of survey questions known as a ballot ("ballot"), each survey question ("ballot question") having one or more answers, each answer comprised of a person or persons ("candidate") that may be selected for an office, position, or membership, or a possible opinion on policy or course of action ("policy"). In an election, a voting participant may be presented with ballot questions, candidates, and policies that are based on the jurisdiction and/or subdivisions within such a jurisdiction of the voting participant. An election may be held by any jurisdiction. In an election, a voting participant may express an opinion on zero or more candidates and/or policies. If an opinion poll includes more than one survey question or interactive question, branching logic may be contained in the opinion poll such that a voting participant response to one question may control and/or configure the next question and possible answers that are presented to the voting participant. Survey questions and interactive questions may take many forms and have many types of answers such as multiple-choice, preference, rank order, Likert, degrees of agreement or disagreement, yes or no, and free text. An interactive question is a question that is presented to a voting participant during an event, typically in response to ongoing content of the event. Media content associated with an event is comprised of text, audio, and/or video content. An interactive question may be created before an event and presented to a voting participant during the event. An interactive question may be created dynamically during an event and presented to a voting participant during the event. An interactive question may ask for a single interactive response from a voting participant. An interactive question may ask for a continuous interactive response comprising a Likert or semantic response to event content. An interactive question may provide functionality commonly known as "dial-testing" as an interactive response to an event. One embodiment of an interactive opinion poll would be an opinion poll that includes a question asking the voting participant's approval or disapproval of the ongoing content during an event, rally, presentation, broadcast, advertisement, movie, or streaming session. A voting participant may be present during an event ("in-person event"), observe an event that is presented on a device that is other than the voting participant's device ("watched event") or observe an event that is presented on the voting participant's device ("streamed event"). An event may be an event that is "live," in-progress, or recorded and re-played at a later time. An event is any content presented on a timeline such as a presentation, produced content, advertising, movie, speech, teaching, promotion, sport contest, political event, and/or impromptu happening that is presented on any medium such as web hosted, social media, streaming, search engine, video service, and/or broadcast. Interactive opinion polls may be configured to respond to an event as designated by a system administrative user or be initiated by an authorized participant. An opinion poll may include supporting material and/or media to provide context, instructions, or explanation of the topics included in a question. Answers to non-interactive questions are typically submitted together as a single response. Answers to interactive questions are typically submitted as individual answers or smaller groups of answers that make up a single response. Voting participants may be selectively qualified to participate in an opinion poll based on factors such as voting participant characteristics such as age, gender, and party affiliation, residence, jurisdiction, geographic location in general or at a specific point in time, and voting participant preferences. After an opinion poll is published, the system will accept responses for the opinion poll during one or more specified periods of time. An opinion poll for which the system is accepting responses is known as an "open" or "active" opinion poll.

As referenced herein, the term "application", "software", "application software", "client applications", and "app" are used interchangeably. These terms describe computing instructions that execute on a computing device that comprises a central processor, memory, and data storage where the computing instructions perform operations on data and provide services and functions substantially serially to a user, participant, or other computing device. The computing device on which the instructions are executed may be any physical or virtual computing device.

As referenced herein, the term "client", "personal computing device", "shared computing device", "device", and "client device" are used interchangeably and may be also described using terms such as "mobile device", "phone", "smartphone", "tablet", "notebook", "laptop", "desktop", "voting station", and "vote scanning station". These terms generally describe a physical or virtual computing device that comprises a central processor, memory, and data storage where the computing instructions perform operations on data such that one or more applications are executed. As referenced herein, the term "voting station" is further defined as a computing device used by one or more voters to cast a ballot in an election. As referenced herein, the term "vote scanning station" is further defined as a computing device used by one or more voters to scan physical media that is marked with voter responses in an election.

As referenced herein, the term "service" and "application service" are used interchangeably and generally describe computing instructions that execute on a computing device that comprises a central processor, memory, and data storage where the computing instructions perform operations on data and provide services and functions substantially simultaneously to more than one user, participant, or other computing device. The computing device on which the instructions are executed may be any physical or virtual computing device such as a server or virtualized server.

As referenced herein, the term "application server", "server computing device", and "server" are used interchangeably. These terms generally describe a physical or virtual computing device that comprises a central processor, memory, and data storage where the computing instructions perform operations on data such that one or more application services are executed.

As referenced herein and unless otherwise noted, encryption ("E"), decryption ("D"), signing ("S"), and verify ("V") operations use asymmetric encryption algorithms such as RSA, DSA, ECC, and Diffie-Hellman with published standard methodologies. Subscripts that follow E, D, S, and V indicate that the operation uses a certificate or key representing the specified entity. For example, $E_{PAR}$(Content) references an operation to encrypt Content using the public key representing Participant PAR, $D_{PAR}$(Content) references an operation to decrypt Content using the private key representing Participant PAR, $S_{PAR}$(Content) references an operation to sign Content using the private key representing Participant PAR, and $V_{PAR}$(Content) references an operation to verify a signature on Content using the public key representing Participant PAR. As referenced herein and unless otherwise noted hash ("H") operations use hashing algorithms such as SHA256 with published standard methodologies.

Digital certificates may be used to authenticate entities in the disclosed embodiments. Digital certificates are typically issued in response to a Certificate Signing Request CSR from an entity. Digital certificates may be issued by a private or public certificate authority. The designation of CERTPAR refers to a digital certificate representing a specified entity, in this example, Participant PAR. The designation of PRIVPAR refers to a private key representing a specified entity, in this example, Participant PAR. Entities such as Participant PAR referenced as a subscript refer to instances of the entity. If such subscript has "—C" appended to the subscript it is a reference to a common certificate and private key shared among all instances of that entity.

Encryption, decryption, signing, verification, hash, blinding, timestamping, random number generation, chains, and other cryptographic and cryptographic related functions described herein are best understood to substantially conform to accepted cryptographic protocols using best practices except where noted. Best practices for a particular protocol can vary based on a number of factors such as risk factors and security requirements. Typically, asymmetric protocols disclosed here use separate key pairs for signing and encryption.

References to signing or sign S and verification or verify V are references to operations using digital signature protocols to apply a digital signature to a block of data. Digital signatures may include timestamps, but some digital signatures in the disclosed embodiments may not use timestamping in order to improve the security of the protocol. Timestamping may not be present in some digital signatures in order to eliminate timing or implied ordering of certain operations that should such ordering be revealed, would allow an attacker to more easily guess a particular voting participant response. Digital signatures with timestamping may use internal or external timestamping services.

As referenced herein, "Chains" are linked and signed blocks of data used for purposes such as maintaining an unforgeable record of transactions. Chains have implementations that can vary according to best practices and risk model for a given problem. Chains referenced herein are constructed as linked chains with a general construction as described here. Chain Instance CI is the instance of a Chain that may exist in multiple portions, each having a unique Chain Instance CI. Chain Number CN is the ordinal number of the item in the chain, beginning at one for the first item and ending with the maximum value of Chain Number CN for the last item. When used as a subscript, Chain Number CN indicates the current item in the Chain and Chain Number CN-1 indicates the previous item in the Chain. Chain Content CC is any data to be included in the Chain. Current time that the item is included in the Chain is t. A Chain item is signed by the service or entity that is constructing the Chain. Chain Link CL is a hash of the previous Chain item constructed as $CL_{CN}$: $H(CCC_{N-1}, CL_{CN}-1)$. The Chain item is constructed as $S_{SRV}(CI_{CN}, CN_{CN}, CC_{CN}, t_{CN}, CL_{CN})$. Chain Content $CC_{CN}$ and Chain Link $CL_{CN}$ are stored for use in constructing the next Chain item. For Chain item with Chain Number CN equal to one, Chain Link $CL_{CN}$ will use a value of zero and Time t will be the current time. For Chain item with Chain Number CN equal to maximum value, Time t will be the current time. Time t may be optionally zero for all other Chain items. Time t may optionally be non-zero for all Chain items or a Chain item with Chain Number CN issued at a particular time or particular intervals of time.

Asymmetric encryption protocols use a private and public key for operations. The security of asymmetric encryption protocols has a significant dependence on the ability to keep a private key from disclosure or dissemination to any party except the party authorized to use it. A number of schemes have been proposed to attempt to keep a private key from disclosure. The efficacy of each scheme is informed by the potential negative effects of the disclosure of the private key. For example, if the private key and associated public key are single-use keys, then suitable protection of the private key is relatively easy. On the other hand, if a private key is to be used for long periods of time, then suitable protection of the private key is extremely difficult. Tamper resistant hardware cryptographic modules have been created to store private keys and accomplish operations that require a private key. Tamper resistant hardware cryptographic modules provide reasonable protection of a private key, but are typically slow and inflexible. Alternatively, a private key may be protected by encrypting the private key for storage and decrypting it into memory before use, thus providing a measure of security. The adequacy of the security used to protect the private key must be judged by the relative risk of private key exposure. Some of the entities in the disclosed embodiments require very high security such as Certificate Authority CA, system administrators, and some Voting Participant(s) VPAR that are public figures. Some of the entities in the disclosed embodiments require only moderate security such as a Voting Participant VPAR because digital credential usage can be monitored and digital credentials may be replaced as necessary using the underlying authority of authorized voter credentials such as a valid voter registration in a governmental jurisdiction or valid membership in an organizational group. The disclosed embodiments use a range of security mechanisms and protocols to protect private keys based on the risk of exposure of a given operation or entity. Additional protocols may be used in addition to in or place of disclosed protocols to implement multi-factor security.

At least one embodiment described herein includes a system and method that comprises an "Account Authority Digital Certificate" that is a digital certificate issued to a person, participant, entity, or device that does not include personal or specific information that would identify the person, participant, entity, or device. Account Authority Digital Certificates may be issued based on governmental or organizational credentials and are linked to such credentials without disclosing the content of such credentials. An Account Authority Digital Certificate may include properties and values that communicate the rights, privileges, and characteristics granted to the person, participant, entity, or device. Multiple Account Authority Digital Certificates may reference the same underlying governmental or organizational credentials or may not reference any underlying credentials.

At least one embodiment described herein includes a system and method that comprises digital tokens and/or tickets that are comprised of content that is signed and verified using a "blind signature" protocol similar to the protocol disclosed by David Chaum. As disclosed herein, a blind signature protocol may be used for a blinded authorization comprising the following steps: a) a requestor performs a blind signature protocol blinding operation on original content resulting in blinded content, b) an authorizer performs a digital signature on the blinded content resulting in signed blinded content, and c) the requestor performs a blind signature protocol unblinding operation on the signed blinded content resulting in signed original content that can be verified as signed with a valid digital signature of the authorizer thereby showing the original content as authorized by authorizer even though the authorizer has no knowledge of the original content. Content may be blinded by multiple requestors in a certain order before an authorizer performs a digital signature, after which the content may be unblinded by multiple requestors in reverse order, each requestor having the ability to recover their original content and verify the signature of the authorizer on their content.

At least one embodiment described herein includes a system and method that comprises "split-key" digital signatures of content that is accomplished by using a private key that has been divided into two or more portions referred to as $PRIV_{D1}, PRIV_{D2}, \ldots PRIV_{Dn}$ such that a) all private key portions are required to create a valid digital signature, and b) the discovery of any private key portion does not lead to the discovery of any of the other private key portions.

At least one embodiment described herein includes a system and method that comprises asymmetric digital key pairs that are temporary and used for a single purpose or a limited number of related operations. At least one embodiment uses a temporary asymmetric digital key pair to submit and validate the responses or an interactive responses to opinion poll, after which the temporary asymmetric digital key pair is discarded. The private portion of the key pair is confidentially held by a single entity or divided among two or more entities. If the private key is held by multiple entities, the key may be generated by a trusted party and divided among the entities, or it may be generated by multiple parties using multi-party key generation protocols. Signing and encryption operations that use a private key that is divided among multiple entities require that those entities participate in the signing or encryption operation using appropriate protocols. The use of single purpose or limited use asymmetric digital key pairs allows a voting participant to provide reasonable guarantees that the voting participant identity does not change during the course of an opinion poll and its related operations. Certificates associated with temporary asymmetric digital key pairs typically do not hold personally identifiable information.

An embodiment described herein may include a system and method that comprises a "digital witness" protocol that provides a means by which an attribute, identity, or action of a first member is witnessed and/or attested to by one or more second members. In one embodiment of a digital witness protocol, a first member establishes an authenticated and independent session between an application executing on a device under the control of the first member and an application service. A designated attribute, identity, or action of a first member is associated with a first token, barcode, or other identifying information that is generated in the session between the first member and the application service. Digital signatures may be applied to the first token, barcode, or other identifying information by the first member and/or the application service. The application service does not share the first token, barcode, or other identifying information with any second members. One or more second members agree to witness or attest to the designated attribute, identity, or action of the first member. The first member shares the first token, barcode, other identifying information with the one or more second members in a form that the first token, barcode, other identifying information is received by one or more second members into the application executing on a device via the screen, keyboard, camera, wireless network, or other means. The one or more second members establish an authenticated and independent session between an application executing on a device under the control of the second member and an application service and present the first the first token, barcode, other identifying information to the application service. A second token, barcode, or other identifying information is generated in the session between each second member and the application service and is associated with the first token, barcode, or other identifying information provided by the second member to the application service. Digital signatures may be applied to the second token, barcode, or other identifying information by the second member and/or the application service. The application service does not share the second token, barcode, or other identifying information with the first member. The first member provides evidence to the one or more second members that the attribute, identity, or action of a first member is correct, accurate, factual, complete, appropriate, and/or true. Each second member that is convinced by such evidence provided by the first member, shares the second token, barcode, other identifying information with the first member in a form that the second token, barcode, other identifying information is received by the first member into the application executing on a device via the screen, keyboard, camera, wireless network, or other means. The first member uses the established session to present the second token, barcode, or other identifying information to the application service. The application service validates the information and optionally validates the digital signatures of the first token, barcode, other identifying information and one or more second tokens, barcodes, other identifying information from all participating first and second members. If the application service determines that the first member has presented a sufficient number of accurate and validated second tokens, barcodes, other identifying information, then the application service deems that the attribute, identity, or action of a first member is witnessed and/or attested to by one or more second members. Other embodiments of a digital witness protocol may augment the disclosed protocol with bit commitment, blind signature, zkSNARK, or other schemes to limit the ability for a first member, second member, or application service to provide a fraudulent witness of an attribute, identity, or action of a first member.

At least one embodiment described herein includes a system and method that comprises a response format in which questions and/or answers are replaced by one or more response formats such as information submission, data submission, forums, social media discussions, news reporting, discussion, dialogue, news, chat, and collaboration. Such response formats are characterized by responses from voting participants that may be published as individual responses in lieu of tallied pre-defined response totals. Further, such responses may be analyzed for trends, intentions, and/or specific content and results tallied and reported based on such analysis. Further, such response formats use the same system and method disclosed herein in which participants are definitively authenticated while the information, opinions, dialogue, reporting, media, comments, and/or questions expressed by participants are published anonymously. An example of such an embodiment would be social media type service in which participants are definitively authenticated and their contributions are separated from their identifying information. Another example of such an embodiment would be a submittal system for sensitive or private information such that participants are definitively authenticated, and their contributions are anonymous. This type of embodiment could be advantageously used to allow participants to submit anonymous medical information, DNA information, whistleblower information, or public reporting.

At least one embodiment described herein includes a Remediation Mode that comprises the disclosure of information that will allow unauthorized responses to be removed from the results. Remediation Mode allows the configuration of the system to support a) very strong anonymity in which only the voting participant is able to link the participant identity to their response, b) strong accountability in the case of provable error or fraud, allowing a trusted Remediation REM service to discover the connection between a participant and their response, or c) risk limiting audits that use test responses to audit performance in real-time during the opinion poll, and/or d) allow a Voting Participant to request an audit of their response. If Remediation Mode is disabled, fraudulent or inconsistent responses can be reported, but cannot be removed from the results. If Remediation Mode is enabled for all responses, then fraudulent or inconsistent responses can be reported and removed from the results. Using Remediation Mode for test responses is a unique method to catch errors and malicious actions while the opinion poll is in progress. Using Remediation Mode to accomplish test responses is an especially effective means of real-time primary and satellite replica testing during elections or other opinion polls. Test responses are submitted by test participants and are indistinguishable from authorized responses. Test responses are processed in the normal flow of response processing to show that services are processing data correctly and accurately without cheating. Test responses are a form of a risk limiting audit that can be performed during the opinion poll to a provide real-time discovery of malicious services and/or service errors. By using Remediation Mode to implement test responses, response processing can be tested in real-time without affecting the authorized results of the opinion poll. Using Remediation Mode options, a Voting Participant may request that Audit AUD perform a specific end-to-end audit of their response and provide some public or private assurance of the correctness, accuracy, and completeness of their response.

As referenced herein, Service SVC refers to one or more types of services and may include other information such as service type, service subtype, service conditions, and service limitations using sufficient parameters to distinguish referenced operations, some examples being login services, feed services, response services, administration services, and auditor services.

FIG. 1 shows an overall view of a system and method for reliable opinion polls. This figure describes one embodiment of an overall system view that comprises voting participants, participants, devices, secure links, firewall, network services, application servers, and application services. This FIG. 1 presents a general description of the system components and participants and how they are linked together. Additional details about specific operations and functions can be found in other FIGS. For clarity, only select examples of system components and participants are illustrated to describe the overall concept of the disclosed system. The disclosed system may be replicated in whole or in part ("replica") in multiple physical or logical locations, having one or more replicas configured to function as a primary replica that is actively processing opinion polls and optionally having a) one or more replicas configured to function as a secondary replica that receives processed data and synchronize with a primary replica, and/or b) one or more replicas or partial replicas that are configured to function as a satellite replica which i) performs at least a portion of the functions of a primary replica, ii) may receive orchestration, configuration, setup, initialization, and verification data and services from a primary replica, iii) functions as a disclosed system for reliable opinion polls to collect a portion of the responses to one or more opinion polls, and iv) sends voting participant responses, auditing data, and other data to one or more primary replicas for data aggregation, auditing, or other purpose. Primary, secondary, satellite, and third-party replicas or portions of a replica that coordinate processes are collectively known as a "system". Select system service instances may be hosted by third parties for auditing, accountability, and/or security purposes. All communication links between system components and participants are configured to be secure and/or authenticated. Various embodiments of secure communication are disclosed and are configured to meet the security requirements of the embodied functionality. Secure communication implementation methods may vary and may be updated to improve and/or maintain best practices over time. One embodiment of secure communication links uses TLS secure tunnel protocols with server authentication or client and server authentication. Further, secure tunnel communication channels may exist within other secure tunnel communication channels. In addition to secure communication links, secure process protocols may be implemented for privacy and authentication between system components, entities, services, applications, servers, networks, clients, devices, and/or participants. In one embodiment, digital certificates are used to sign, verify, encrypt, and decrypt data that is communicated between processes. For clarity, secure communication channels are assumed and may be omitted from the FIGS. in this disclosure.

Voting Participant VPAR 101 provides one or more responses to one or more questions in an opinion poll. The responses expressed by Voting Participant VPAR 101 are cryptographically separated from the identity of the Voting Participant VPAR 101 so that a disclosed embodiment allows Voting Participant VPAR 101 to freely express an anonymous opinion that is separate from the identity of Voting Participant VPAR 101. Voting Participant VPAR 101 performs disclosed functions using one or more Devices DEV 102 that are configured with application software. Voting Participant VPAR 101 is approved as a member by successfully completing an onboarding process to gain authorized access to the system. Voting Participant VPAR 101 may provide additional profile data. Application software provides features and functions provided to Voting Participant VPAR 101 such as notification of the availability of opinion polls, participation in opinion polls, background and education information on topics addressed in opinion polls, results of opinion polls, ability to submit questions that might be of interest to other participants, notice of various events and activities of interest, opportunity to provide financial support to the operator of the system, referral and invitation for others to participate in the system, access to customer support, ability to edit preferences and profile information, updates on news and events, and add or remove authorized devices from the participant's account. Voting Participant VPAR 101 submits answers to opinion poll questions that may be grouped together as a response to be submitted, verified and/or audited, tallied, and reported in total and may report based on subgroups of participant characteristics and attributes. Voting Participant VPAR 101 utilizes one or more Device DEV 102 that have been configured with application software and computing instructions so that the computing device features such as a camera, fingerprint reader, buttons, screens, processors, and cryptographic processors operate application software to perform the functions and algorithms described herein to accomplish the desired results of the disclosed embodiment. In this disclosure and FIGS., any computing actions and/or processing said to be accomplished by Voting Participant VPAR 101 are assumed to be performed by one or more Device DEV 102 under the control of Voting Participant VPAR 101 to accomplish the disclosed outcome. Examples of Device DEV 102 include computing devices such as mobile devices, tablets, phones, notebooks, desktops, thin clients, voting stations, shared computing devices, and custom computing devices. Device DEV 102 may be a purpose-built computing device for use in elections that includes features such as a touch screen, dial-base input, printer, or scanner. Device DEV 102 may be used only by Voting Participant VPAR 101 or Device DEV 102 may be shared among multiple Participants VPAR 101 such as would be done in an local polling location for an election. In one embodiment, Device DEV 102 connects via the Internet 161 over secure link 104 with services such as gateways 171, 172, 173, 174, 175 internal networks 110, 111, 112 and application services 131, 132, 133, 134, 135, 136, 137, 138, 142 to accomplish the desired results of the disclosed embodiment. In another embodiment, Internet 161 is replaced by a local or private network that is not shown in this FIG.

Participant PAR 151 functions may be variously described as observer, auditor, partner, media partner, system administrator, system user, and other types of users. Participant PAR 151 acting as an observer has functionality such as reading, archiving, validating, reporting, and analyzing opinion poll responses. Participant PAR 151 acting as an auditor has functionality such as reading, validating, processing, saving, reporting, analyzing, scanning responses recorded on paper, and auditing opinion poll responses and/or voter eligibility. Participant PAR 151 acting as a partner has functionality such as participating in select services of the disclosed protocol, providing content, or providing services. Participant PAR 151 acting as a media partner may provide content and/or retrieve opinion poll response tallies and data for further distribution. Participant PAR 151 acting as a system administrator or system user manages all or an authorized portion of system operations and/or participant support functionality. Participant PAR 151 is approved as a member by successfully completing an onboarding process to gain authorized access to the system. Some types of Participant PAR 151 may be granted access to some system functions and public data without being approved as a member. Participant PAR 151 may utilize one or more Devices DEV 152 that have been configured with application software and computing instructions so that the computing device features such as a camera, fingerprint reader, buttons, screens, processors, scanners, and cryptographic processors operate application software to perform the functions and algorithms described herein to accomplish the desired results of the disclosed embodiment. Participant PAR 151 may utilize Participant Application Programming Interface PARAPI 153 such that application software under the control of Participant PAR 151 interacts with published application programming interface specifications to perform functions and algorithms described herein to accomplish the selected results of the disclosed embodiment. In this disclosure and FIGS., any computing actions and/or processing said to be accomplished by Participant PAR 151 are assumed to be performed by one or more Devices DEV 152 and/or Participant Application Programming Interface PARAPI 153 under the control of Participant PAR 151 to accomplish the disclosed outcome. Participant Application Programming Interface PARAPI 153 may be used to provide data exchange services between primary, secondary, and/or satellite replicas. Examples of Device DEV 152 include computing devices such as mobile devices, tablets, phones, notebooks, desktops, thin clients, servers, voting stations, shared computing devices, and custom computing devices. Device DEV 152 may be a purpose-built computing device for use in elections that includes features such as a touch screen, dial-base input, printer, or scanner. In one embodiment, Device DEV 152 and Participant Application Programming Interface PARAPI 153 connect via the Internet 161 over secure link 154 with services such as gateways 171, 172, 173, 174, 175 internal networks 110, 111, 112 and application services 131, 132, 133, 134, 135, 136, 137, 138, 142 to accomplish the desired results of the disclosed embodiment. In another embodiment, Internet 161 is replaced by a local or private network that is not shown in this FIG.

Communication links 104, 154 between system components and participants are configured to be secure and/or authenticated links for secure data streams 106, 156 between Devices DEV 102, Devices DEV 152, and Participant Application Programming Interface PARTAPI 153 and application services. Firewall FW 105 establishes a barrier between trusted and untrusted system components and participants. Firewall FW 105 monitors and controls incoming and outgoing network traffic based on predetermined security rules. All messages entering or leaving Firewall 105 must pass through the firewall, which examines each message and blocks those that do not meet the specified security criteria. Firewall 105 may include any number of devices and/or applications that implement firewall functionality. For clarity, Firewall 105 is assumed and may be omitted from the other FIGS. in this disclosure.

Gateways 171, 172, 173, 174, 175 are application servers and/or application services that act as a reverse proxy to distribute secure link 104, 154 or data streams 106, 156 to application servers and application services. Gateways 171, 172, 173, 174, 175 may forward secure link 104, 154 to one or more applications servers or application services or may function as the endpoint of secure link 104, 154. Gateways that function as the endpoint of secure link 104, 154 may authenticate and validate access rights of Voting Participant VPAR 101, Participant PAR 151, Device DEV 102, Device DEV 152, and/or or Participant Application Programming Interface PARAPI 153, may analyze and process data stream 106, 156, may forward data stream 106, 156 to one more application servers or application services, and may return any resulting data stream to the originator. Secure link 104, 154 contains data stream 106, 156 that includes unencrypted and/or encrypted data which is forwarded to one or more application servers or application services capable of decrypting and/or processing the data. Each type of Gateway 171, 172, 173, 174, 175 includes any number of devices and/or applications that embody multiple instances of a Gateway type. Gateways may implement network security and intrusion detection and mitigation functionality. Gateways may implement or use application services for session and results caching. Gateways may include application service functionality. Gateways may be controlled, configured, and/or managed by Conductor CON 181. Gateways are configured for optimal link security, network traffic management, process integrity and security, load balancing, operational redundancy, and failover transparency. For clarity, gateways are assumed and may be omitted from the other FIGS. in this disclosure.

Networks 110, 111, 112 provide communication links between all internal system components such as firewalls, gateways, application servers, application services, databases, certificate servers, and controllers. Networks 110, 111, 112 includes one or more physical and logical networks and are configured based on best practices for security, redundancy, failover, throughout, management, and monitoring. Networks may be controlled, configured, and/or managed by Conductor CON 181. For clarity, networks are assumed and may be omitted from the other FIGS. in this disclosure.

Application services 131, 132, 133, 134, 135, 136, 137, 138 are representative application services that provide functionality for the embodiments described herein. Application services use networks 110, 111, 112, databases 141, other application services, and other resources as necessary to accomplish the desired results of a disclosed embodiment. Additional application servers and application services that do not appear in this FIG. may be used within the system. Application services utilize a wide variety of other services such as servers, other application services, gateways, certificate authorities, external databases, internal databases, shared application services, shared hardware resources, and third-party services. Each type of application service includes one or more instances of the application service that exist in one or more locations and/or replicas. Application services are configured based on best practices for information security, physical security, redundancy, failover, throughput, network traffic, management, and monitoring. Specific application services are more fully described in other FIGS. Application servers and application services may be controlled, configured, and/or managed by Conductor CON 181. Application servers and application services may use secure DNS, trusted Certificate Authority, TLS secured connections, and/or other authentication process to establish a trust relationship with Conductor CON 181 and/or other application servers and application services. Application servers and application services may engage in various agreement protocols to negotiate system parameters for application server and/or application services such as configuration, function roles, security levels, and acceptable digital credentials. Application servers and application services may use specialized hardware such as tamper resistant hardware cryptographic modules.

Database Server DAT 141 provides persistent storage for data and is configured based on best practices for information security, physical security, redundancy, failover, throughout, management, and monitoring. Multiple instances of Database Server DAT 141 may be included in the system as standalone instances or as instances that are included with one or more application services. Each Database Server DAT 141 includes one or more devices and/or applications. Each Database Server DAT 141 may be embodied as a row-based SQL server, a column-based SQL server, a value-pair type server, or other data server, may persist data in memory or on disk, and may operate as single stand-alone servers or in collaborative clusters of servers.

Certificate Authority CA 142 issues digital certificates that identify and/or authorize system entities such as devices, voting participants, participants, observers, users, administrators, application servers, application services, databases, other servers, gateways, and controllers. Certificate Authority CA 142 is configured based on best practices for information security, physical security, redundancy, failover, throughout, management, and monitoring.

Conductor CON 181 is a special purpose application service that orchestrates the system described in this embodiment. Conductor CON 181 includes functions such as identifying, authenticating, authorizing, configuring, controlling, load balancing, scaling, orchestrating, coordinating multiple systems, and monitoring system and application services. Conductor CON 181 may orchestrate primary, secondary, and/or satellite replicas with the system. In one embodiment, Conductor CON 181 in a primary replica may also serve as a master conductor that orchestrates a portion of orchestration functionality in other primary replicas, secondary replicas, and/or satellite replicas.

When an opinion poll is an election, a satellite replica may include additional functionality such as storing multiple copies of response data, sending a portion of data in substantially real-time to a primary replica, having one or more members that are authorized to manage satellite replica operations, printing physical documents that contain voter responses, scanning physical documents that contain voter responses on dedicated devices, enabling retaining physical documents that contain voter responses, enabling the security of devices and servers before, during, and after an election, delivering data stored in electronic format to a primary replica, using local copies of voter registration data, having designated Group Id GID and Group Token GT configurations, and/or having a local network in the place of Internet 161.

Figure 2:
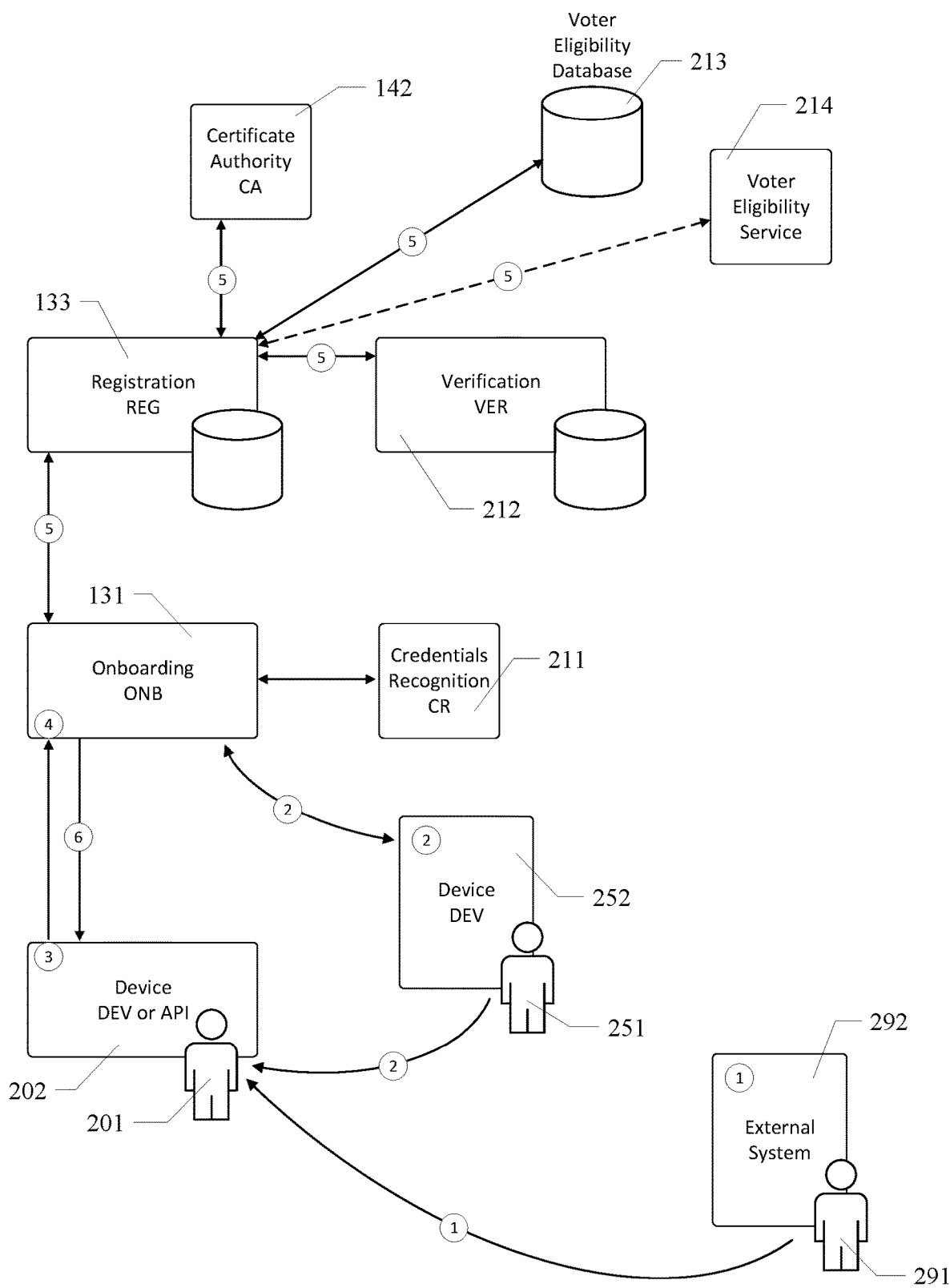
FIG. 2 shows a view of the onboarding services for a system and method for reliable opinion polls according to an embodiment of the disclosed subject matter.

FIG. 2 shows a view of the onboarding services for a system and method for reliable opinion polls. This figure describes one embodiment of the participant onboarding process in which a participant initiates and completes an onboarding process that results in a participant becoming a member. Participant PAR 201 is Voting Participant VPAR 101 or Participant PAR 151 that will be qualified as a member as described by this FIG. Device DEV 202 is Device DEV 102 under the control of Participant PAR 201, a voting station under the control of Participant PAR 201, or Device DEV 152 and/or Participant Application Programming Interface PARAPI 153 under the control of Participant PAR 201. Participant PAR 251 is Participant PAR 151 that has been previously qualified as a member and granted the authority to validate and issue Group Tokens GT. Device DEV 252 is Device DEV 152 and/or Participant Application Programming Interface PARAPI 153 under the control of Participant PAR 251. External Actor 291 is recognized as having been granted the authority to validate and issue Group Tokens GT using External System 292. Onboarding may use one or more credentials with optional confirming biometrics or digital witness to reasonably provide the required measure of assurance of the identity of Participant PAR 201 and thereby allowing the determination directly or indirectly that Participant PAR 201 is qualified for status as member and/or a voting participant with certain rights and privileges. Under the guidance of configurable membership and rights polices, onboarding relies on an established identity of Participant PAR 201 to grant membership and/or Voting Participant status in the context of one or more groups, institutions, organizations, governmental, and/or political units. For the purposes of onboarding, credentials may be used as a) assurance of identity, b) basis of granting rights in the system, or c) both assurance of identity and the basis of granting rights in the system. Credentials can take the form of government issued credentials such as driver's license or passport, Group Token GT issued by Participant PAR 251 using Onboarding ONB 131 functionalities, or Group Token GT issued by External Actor 291 using External System 292. Group Token GT is issued to confirm and communicate that Participant PAR 201 is a known member of a group that is qualified to be granted membership rights during this onboarding process, those rights confirmed by one or more reliable sources of knowledge such as government-issued credentials, biometrics, personal knowledge, institutional knowledge, and/or public knowledge. Group Token GT may take the form of text and/or encoded data such as barcodes and OCR representations. Group Token GT may include Group Id GID, Unique Id UID, limitations on Survey Id SID participation, quantity limitations, time limitations, and/or system references to such information. Group Token GT and/or government credentials may be optionally confirmed with Participant PAR 201 biometrics and/or collaborating digital witness. During the onboarding process, the Participant PAR 201 may be asked to capture images of acceptable credentials. If possible, optical character recognition will be performed on Device DEV 202, 252 so that text and data are captured on Device DEV 202, 252 from the credential images. Primary and secondary credentials may be required for onboarding. Biometric images such as facial, hand, eye, or other biometric images may be required for onboarding. Images may be securely transmitted to application services for optical character recognition and other authenticity validation. Group Token GT is presented for onboarding in step 3. Group Token GT contains Group Id GID that is preconfigured on the system with policies and configuration settings for the authorized Group Id GID.

Group Token GT polices may include parameters and limitations on voting participant rights, Survey Id SID participation, quantity, location, lifetime, and authorizing parties. Group Token GT polices may recognized the implicit or explicit authority Participant PAR 251 and/or External Actor 291 to issue Group Tokens GT, require digital signatures or other security parameters, and/or specify interface methods and parameters require for system interfaces with external systems. Group Token GT may comprise only a Group Id GID that can be used for onboarding for all participants. Group Token GT may comprise a unique onboarding information for each participant. Group Token GT may be signed by Participant PAR 251 or External Actor 291 using certificates from a recognized authority. During the onboarding process, Participant PAR 201 may indicate preferences, profile data, trusted participants, and group memberships. Participant PAR 201 may select to participate in a group by presenting credentials or tokens in the form of quantity, group, unique, or time limited representations of acceptable authentication in the form of text or encoded data such as barcodes. Participant PAR 201 may select other participants to act as a trusted affiliate to delegate specific rights and responsibilities to the trusted affiliate by presenting credentials or tokens in the form of quantity, group, unique, or time limited representations of acceptable authentication in the form of text or encoded data. When an opinion poll is an election, the purpose of onboarding is to qualify Participant PAR 201 as a voter who is eligible to vote in the election at an authorized location. Participant PAR 201 may be qualified by several methods such as a) using a voting station and government-issued credentials for onboarding as described in step 3 to 6, b) using a Group Token GT issued in step 2 and for onboarding in step 3 to 6, or c) using a Group Token GT issued in step 1 for onboarding in step 3 to 6. Typically, a Participant PAR 201 in an election is granted a qualification to vote in only the current election using a single ballot at an authorized location. Although this FIG. describes an embodiment using a single instance of each service, multiple instances of services may be used to accomplish this embodiment. Numbers inside of a circle are included as a convenience to indicate steps in the described protocol. Lines with directional arrows are included to show the flow of information from one step to the next step. These steps and descriptions may have other embodiments that utilize additional or different devices, application servers, application services, steps, dataflow, data types, data parameters, algorithms, key lengths, proofs, and protocols to accomplish a similar outcome.

In step 1, External Actor 291 is a preauthorized and trusted actor that uses External System 292 to prepare Group Token GT. When External Actor 291 is convinced that Participant PAR 201 is qualified as a member or voting participant, External Actor 291 constructs Group Token GT to validate that Participant PAR 201 is qualified. Group Token GT is constructed based on pre-arranged parameters with the system. Group Token GT is communicated to Participant PAR 201 in a physical or electronic medium in the form of text or encoded data. Participant PAR 201 presents Group Token GT in step 3. If required, External Actor 291 ensures that External System 292 is configured to validate to the system that Group Token GT was properly issued.

In step 2, Participant PAR 251 is a preauthorized member that uses Device DEV 252 to prepare Group Token GT. Participant PAR 251 optionally uses Onboarding ONB 131 functionalities to assist in validating the right of Participant PAR 251 to become a member or voting participant. When Participant PAR 251 is convinced that Participant PAR 201 is qualified as a member or voting participant, Participant PAR 251 constructs Group Token GT to validate that Participant PAR 201 is qualified. Group Token GT is constructed based on pre-arranged parameters with the system. Participant PAR 251 signs $S_{PAR}$(Group Token GT) and sends to Onboarding ONB 131. Group Token GT is communicated to Participant PAR 201 in a physical or electronic medium in the form of text or encoded data. Participant PAR 201 presents Group Token GT in step 3.

In step 3, Participant PAR 201 uses Device DEV 202 to prepare Membership Request MREQ. Participant PAR 201 uses an application on a computer Device DEV 202 such as a desktop computer, tablet, or mobile device to initiate Membership Request MREQ. The purpose of Membership Request MREQ is to authenticate Participant PAR 201 by using acceptable and valid credentials to establish Participant PAR 201 identity to the sufficient degree to grant Participant PAR 201 membership in the system with the requested and/or specific rights. Further, Participant PAR 201 may be required to be authenticated as a Voting Participant VPAR that is validated as an authorized member of a group or as an authorized voter in a jurisdiction. The application collects zero or more types of information from Participant PAR 201 input and credentials such as identifying information, biometric information, location, government issued credentials information, Group Token GT, group id, participant classification, profile information, jurisdiction and affiliation, contact information, password, security questions, requested access rights, financial information, and device information. The participant credential information is often collected using a process in which the application scans or takes a picture of a government issued identification card such as a driver's license or a Group Token GT. The images of the credentials are processed through optical character recognition and/or barcode reading functionality either on Device DEV 202 or by Credentials Recognition CR 211 during a later step. Text and barcode images are converted into information that is validated for accuracy and may be presented to the Participant PAR 201 for verification. EXIF image information and GPS location may be used as an additional comparative reference for time and location of any captured images. Multiple types of credential information may be collected. For enhanced authentication, facial or other biometric image of Participant PAR 201 may be captured from the credentials to compare against a current facial or other biometric image of Participant PAR 201 captured by Device DEV 202. A suitable asymmetric encryption algorithm is chosen for use with a particular key length and Device DEV 202 or delegated cryptographic processing module is used to generate private keys $PRIV_P$pa, optionally $PRIV_{DEV}$ and public keys $PUB_{PAR}$, optionally $PUB_{DEV}$ that represent Participant PAR 201 and Device DEV 202. Participant Id PID and Device Id DID are generated by hashing selected data with random data. Certificate Signing Request $CSR_{PAR}$ is created for Participant PAR 201 with a Distinguished Name DN comprising Participant Id PID as an identifying element. Optionally, Certificate Signing Request $CSR_{DEV}$ is created for Device DEV 202 with a Distinguished Name DN comprising Device Id DID as an identifying element. Membership Request MREQ is comprised of certificate signing requests, participant credentials, and participant information. Optionally, the Membership Request MREQ may include an Onboarding Marker ONBMK and application version information and be encrypted with an Onboarding Password ONBPW to provide some measure of protection against denial-of-service attacks directed toward the Onboarding ONB 131. Participant PAR 201 uses Device DEV 202 to submit Membership Request MREQ to Onboarding ONB 131.

In step 4, Onboard Service ONB 131 processes a request for Membership Request MREQ. Any denial-of-service passwords are removed and the data is validated. Any credentials that require validation or optical character recognition are extracted and sent to Credentials Recognition CR 211 to extract information, perform quality scoring, compare with other included or stored credentials, and/or access external services for credential scoring and verification. If Group Token GT is included in Membership Request MREQ, Group Token GT is interpreted and checked to be a validated Group Token GT. Any resulting participant information and/or credential quality scores from Credentials Recognition CR 211 and/or Group Token GT are used in the membership granting process and is included with the Membership Request MREQ.

In step 5, Onboard Service ONB 131 sends the updated Membership Request MREQ is submitted to Registration REG 133 for validation and authorization. Unique identifying information is extracted from Membership Request MREQ and used as a unique key to look up any previous membership that uses the same credentials. If matching previous credentials are not found, the Membership Request MREQ is used to qualify a participant for membership. If matching previous credentials are found, the Membership Request MREQ appropriately updates membership information. If voter validation in a jurisdiction is requested or required, Voter Eligibility Database 213 and/or Voter Eligibility Service 214 provide information that is used by the system to determine if a voter should be currently granted rights to express a response to an opinion poll within the context of one or more groups, institutions, organizations, governmental, or political units. Voter Eligibility Database 213 and Voter Eligibility Service 214 will provide information such as name, address, date-of-birth of the voter that is authorized to participate in elections. Voter Eligibility Database 213 is typically a locally accessible database and Voter Eligibility Service 214 is typically an external service. Voter Eligibility Service 214 may be used instead of or in combination with Voter Eligibility Database 213. Information from Voter Eligibility Database 213 and/or Voter Eligibility Service 214 is used to update Participant PAR information with authorized voter information such as voting districts and voting records. Group Token GT is evaluated for correctness, validity, and authenticity. If the participant is found to qualify as authorized voter Voting Participant VPAR, voting rights are granted with the result that Participant PAR 201 is granted rights to submit a response to an opinion poll within the context of one or more groups, institutions, organizations, governmental, and/or political units. Other types of information in Membership Request MREQ may be used to search additional internal or external data sources to enhance eligibility determination as an authorized voter or other type of participant. Participant PAR 201 may also be authenticated, validated, and authorized by a selective process required for specifically granted rights in which a selective process may indicate that the Participant PAR 201 has other, additional, or different rights, examples of which would be media partner or system administrator rights. If the Membership Request MREQ is approved, Certificate Signing Request $CSR_{PAR}$ and optionally Certificate Signing Request $CSR_{DEV}$ are sent to the Certificate Authority CA 142 and certificates are issued for membership. Any limitations present in system policies for Group Id GID or limitation in Group Token GT may be indicated in the Certificate Signing Request. Any Group membership and associated polices are recorded as part of the participant profile. Certificate Authority CA 142 may be an internal or external certificate authority. Certificate Authority CA 142 verifies that Certificate Signing Request $CSR_{PAR}$, $CSR_{DEV}$ contain unique and previously un-issued Distinguished Name DN field data, issues a certificate for the participant $CERT_{PAR}$ and optionally a certificate for the device $CERT_{DEV}$, and then returns certificates $CERT_{PAR}$, $CERT_{DEV}$ to Registration Service 133. Registration Service 133 stores the appropriate participant information from Membership Request MREQ and constructs Voter Verification VV that describes Participant PAR 201. Voter Verification VV allows a both system and third-party verification that Participant PAR 201 is eligible to participate in an opinion poll that requires the participant to be a valid and currently registered voter in a jurisdiction. A minimum of information required for voter validation and date of last validation is included in Voter Verification VV. Voter Verification VV is signed by Registration REG 133 using $PRIV_{REG}$ and encrypted to one or more Voter Verification Partner(s) VVP using a $CERT_{VVP}$. Voter verification is described more fully in FIG. 8. The status of Membership Request MREQ is returned to Onboarding ONB 131 processes along with the appropriate approved or updated membership information, containing information such as issued certificates.

In step 6, Onboarding ONB 131 processes and returns the result of Membership Request MREQ to Device DEV 202 under the control of Participant PAR 201. Device DEV 202 processes the result of Membership Request MREQ. The result of Membership Request MREQ is validated. If Membership Request MREQ is approved, the returned certificates, returned information, private key, group information and limitations, and information contained in the original Membership Request MREQ are stored on Device DEV 202 using best practices. Various errors that occur during Membership Request MREQ process are reported to Participant PAR 201 as appropriate.

Figure 3:
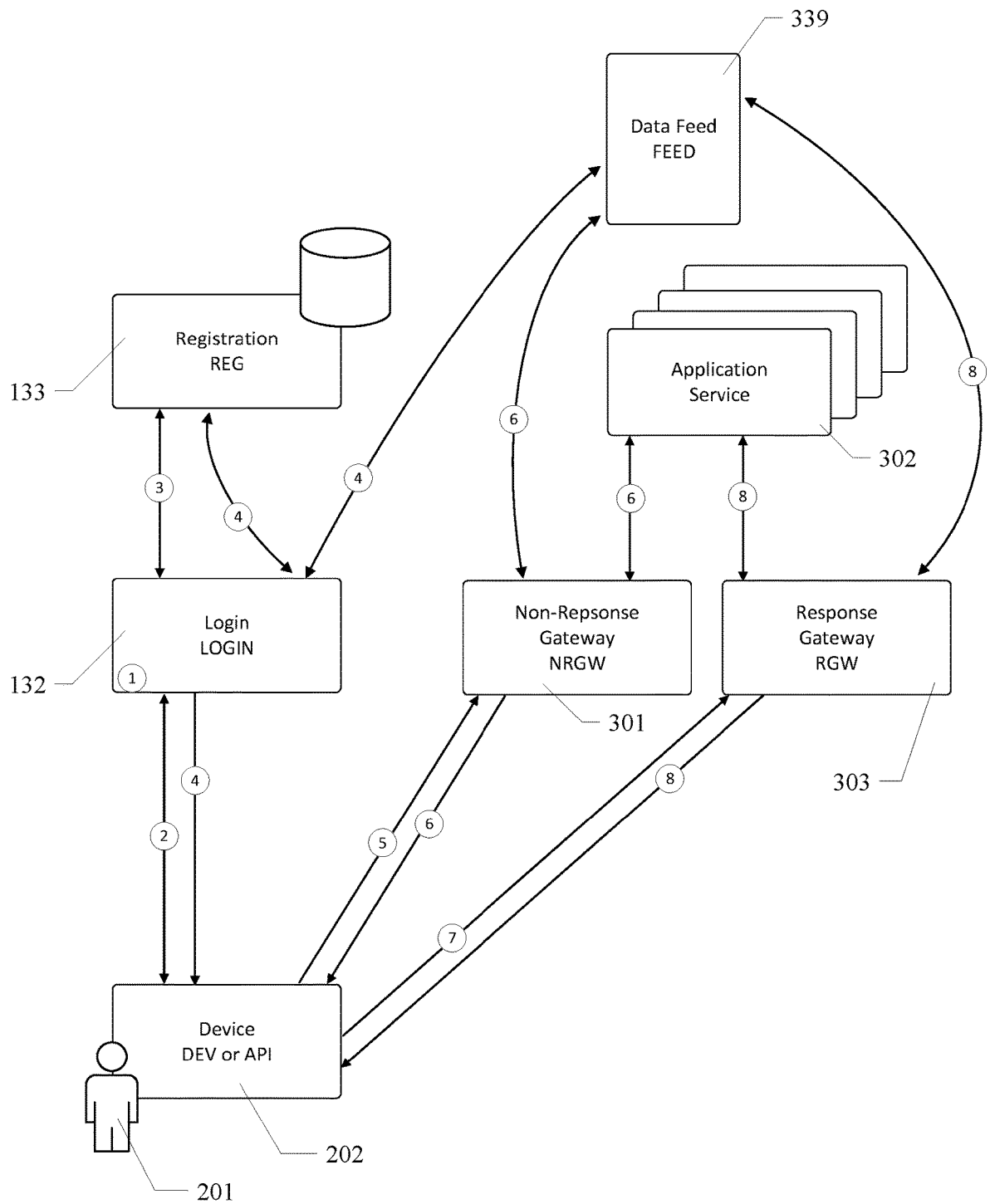
FIG. 3 shows a view of login services for a system and method for reliable opinion polls according to an embodiment of the disclosed subject matter.

FIG. 3 shows a view of login services for a system and method for reliable opinion polls. Login services will allow a participant to be authenticated and obtain a one or more login tokens that can be used to prove a valid login to gateways and application services. This figure describes an embodiment of login services in which login tokens are obtained and used to access gateways and application services. In this embodiment, a participant initiates a request for login tokens. If Login Request LREQ is approved, one or more limited-lifetime tokens will be created that provide proof of a valid login and therefore all access to one or more Services SVC. Session Token STOKEN will be created that grants Participant PAR 201 access to gateways and application services that require Participant Id PID. Response Session Token RSTOKEN will be created that grants Participant PAR 201 access to gateways and application services without revealing Participant Id PID. Session Token STOKEN and Response Session Token RSTOKEN may be reused during their lifetime, but the number of allowed uses may be limited for security and/or application purposes. A participant is required to obtain valid session tokens as a pre-condition to the processes described in FIGS. 4, 5, 6, 7, and 8. Step 1 through step 4 present an embodiment of how login tokens are obtained. Step 5 through step 6 present an embodiment of how login tokens are used in non-response processes. Step 7 through step 8 present an embodiment of how login tokens are used in response processes. Non-response Gateway NRGW 301 comprises system gateways that are not used for response submissions or response services. Response Gateway RGW 303 comprises system gateways for response submissions or response services. Although this FIG. describes an embodiment using a single instance of each service, multiple instances of services may be used to accomplish this embodiment. Numbers inside of a circle are included as a convenience to indicate steps in the described protocol. Lines with directional arrows are included to show the flow of information from one step to the next step. These steps and descriptions may have other embodiments that utilize additional or different devices, application servers, application services, steps, dataflow, data types, data parameters, algorithms, key lengths, proofs, and protocols to accomplish a similar outcome.

In step 1, Login LOG 132 prepares and signs a Lifetime LTOKEN that specifies a configurable start and ending date and time for the validity of login tokens. The same Lifetime LTOKEN may be delivered to all Participants PAR 201 that create a Login Request LREQ during the timeframe that Lifetime LTOKEN is valid.

In step 2, Participant PAR 201 uses an application on Device DEV 202 to prepare Login Request LREQ. Lifetime LTOKEN is retrieved from Login LOG 132 and validated. Blinded Token BTOKEN is comprised of a nonce and Lifetime LTOKEN and is blinded with Login Blinding Factor LBF. Login Request LREQ is comprised of Participant Id PID, Service SVC, current time T, nonce, and Blinded Token BTOKEN. Participant PAR 201 private key $PRIV_{PAR}$ is retrieved from secure storage on Device DEV 202 and used to sign Login Request LREQ. Optionally, Device Id DID and Device DEV 202 private key $PRIV_{DEV}$ are retrieved from secure storage on Device DEV 202 and used to sign Login Request LREQ. Login Request LREQ is submitted to Login LOG 132. Login LOG 132 validates Login Request LREQ by checking the signature, requested Service(s) SVC, and other information. Private keys are stored in secure storage on Device DEV 202 using best practices for the required security profile and may include a variety of constructs including two-factor authentication.

In step 3, Login Request LREQ is submitted to Registration REG 133 which processes Login Request LREQ. Participant Id PID is used to retrieve account information for the participant from Registration REG 133 storage. The retrieved $CERT_{PAR}$ is used to verify the signature on Login Request LREQ. Optionally, the retrieved $CERT_{DEV}$ is used to verify the signature on Login Request LREQ. Participant PAR 201 is validated as a member in good standing, optionally including validation of Device Id DID as an authorized device. Service(s) SVC are validated as allowable services for Participant PAR 201 using system configuration parameters and other validation information. The current time T is appropriately compared to the current time of Registration REG 133. If Login Request LREQ is found to be valid, Login Authorization LATH is comprised of Login Request LREQ, status, and optional Lifetime L that is specific to Participant Id PID. Login Authorization LATH is signed by Registration REG 133 and returned to Login LOG 132.

In step 4, Login LOG 132 processes Login Authorization LATH. Login Authorization LATH is validated using $CERT_{REG}$. If Login Authorization LATH is approved, Session Token STOKEN and Response Session Token RSTOKEN are created using information from Login Request LREQ and Login Authorization LATH. Session Token STOKEN is comprised of Participant Id PID, Lifetime L, Service(s) SVC, and nonce. Lifetime L is the allowable timeframe in which issued tokens are valid and may be determined by system defaults or may specified as the Lifetime L contained in Login Authorization LATH. The Lifetime L may be limited on a system or Participant Id PID basis in order strengthen security. In one embodiment, the Lifetime L of a token is specified as the integral hour or day during which the token is issued. Response Session Token RSTOKEN is comprised of Blinded Token BTOKEN. Session Token STOKEN and Response Session Token RSTOKEN are signed by Login LOG 132. Login Response LRSP is comprised of status, Session Token STOKEN and Response Session Token RSTOKEN as well as optional information retrieved from Registration REG 133 and/or Data Feed FEED 339 such as System Information SYSINFO, Certificate Information CERTINFO, Gateway Information GWINFO, Participant Information PARINFO, and Survey Information SURINFO. System Information SYSINFO is comprised of system information such as availability, number of participants, configuration, available services, and usage statistics. Certificate Information CERTINFO is comprised of the current certificates of authorized gateways and application services. Gateway Information GWINFO is comprised of loading balancing and connection information for use by Device DEV 202 in further interactions with gateways and application services. Participant Information PARINFO is comprised of participant related information such as account, profile, preferences, devices, validation, security, and status. Survey Information SURINFO is comprised of survey related information such as active surveys, active survey results, completed surveys, and completed survey results. Login Response LRSP returned to the Device DEV 202 that is under the control of Participant PAR 201. Device DEV 202 processes Login Response LRSP. Login Response LRSP is validated as appropriate using CERTREG and $CERT_{LOG}$. Response Session Token RSTOKEN is unblinded using Login Blinding Factor LBF and signatures are validated using $CERT_{LOG}$. Session Token STOKEN and Response Session Token RSTOKEN are stored on Device DEV 202 using best practices. Other Login Response LRSP information is validated and used to update configurations and information stored on Device DEV 202.

In step 5, Participant PAR 201 uses Session Token STOKEN to request access to Non-response Gateway NRGW 301 and application services. Application Service 302 is a generic designator for any application service within the system. Session Token STOKEN was provided to Participant PAR 201 by Login Service 132 from earlier login process FIG. 3 step 4. If Session Token STOKEN has a Lifetime L that has expired, then an unexpired token must be acquired before continuing. Participant PAR 201 uses Device DEV 202 to prepare Service Request SRVREQ. Service Request SRVREQ is comprised of Session Token STOKEN, Service SVC, and the information required for the requested services. Service Request SRVREQ is optionally signed by Participant PAR 201 and optionally encrypted to Application Service 302 for Service SVC. Service Request SRVREQ may request one or more Service(s) SVC in a single request. Gateway Request GWREQ is comprised of Session Token STOKEN, Service SVC, Service Request SRVREQ, and the information required for the requested services routing. Gateway Request GWREQ is optionally signed by Participant PAR 201 and/or Device DEV 202. Gateway Request GWREQ is submitted to Non-response Gateway NRGW 301. Non-response Gateway NRGW 301 processes Gateway Request GWREQ. Gateway Request GWREQ is verified by validating the optional signatures, Session Token STOKEN, requested Service(s) SVC, and matching the provided information.

In step 6, Non-response Gateway NRGW 301 sends Service Request SRVREQ to the appropriate Application Service 302 for processing. If more than one Application Service 302 is available for processing, then Non-response Gateway NRGW 301 selects an instance of Application Service 302 based on configuration and usage data obtained from other instances of Non-response Gateway NRGW 301, Conductor CON 181, or other system resources. Application Service 302 processes Service Request SRVREQ. Service Request SRVREQ is decrypted and Participant PAR 201 signature and/or Device DEV 202 signature are validated as required. Service Request SRVREQ is verified by validating Service(s) SVC and matching the provided information. Session Token STOKEN is verified by validating Participant Id PID, Lifetime L, Service(s) SVC, and matching the provided information. If validated, Application Service 302 appropriately processes Service Request SRVREQ and constructs Service Response SVCRSP that contains the result of the service process. Application Service 302 may utilize and optionally forward Service Request SRVREQ to other Application Services 302 for additional processing and results. Application Service 302 creates Service Response SVCRSP that is optionally signed by Application Service 302 and optionally encrypted to Participant PAR 201 and/or Device DEV 202. Non-response Gateway NRGW 301 may optionally construction Gateway Response GWRSP that is comprised of optional information retrieved from Data Feed FEED 339 such as System Information SYSINFO, Certificate Information CERTINFO, Gateway Information GWINFO, and Survey Information SURINFO. System Information SYSINFO is comprised of system information such as availability, number of participants, configuration, available services, and usage statistics. Certificate Information CERTINFO is comprised of the current certificates of authorized gateways and application services. Gateway Information GWINFO is comprised of loading balancing and connection information for use by Device DEV 202 in further interactions with gateways and application services. Survey Information SURINFO is comprised of survey related information such as active surveys, active survey results, completed surveys, and completed survey results. Service Response SRVRSP and/or Gateway Response GWRSP is returned to Device DEV 202 via Non-response Gateway NRGW 301. Device DEV 202 that is under the control of Participant PAR 201 processes the Service Response SRVRSP and/or Gateway Response GWRSP. Service Response SRVRSP is decrypted and Application Service 302 signature is validated as required. Service Response SRVRSP is processed as appropriate for the requested Service SVC. Gateway Response GWRSP is validated and used to update configurations and information stored on Device DEV 202.

In step 7, Participant PAR 201 uses Response Session Token RSTOKEN to request access to Response Gateway RGW 303 and application services. Application Service 302 is a generic designator for any application service within the system. Response Session Token RSTOKEN was provided to Participant PAR 201 by Login Service 132 from earlier login process FIG. 3 step 4. If Response Session Token RSTOKEN has a Lifetime L that has expired, then an unexpired token must be acquired before continuing. Participant PAR 201 uses Device DEV 202 to prepare Service Request SRVREQ. Service Request SRVREQ is comprised of Response Session Token RSTOKEN, Service SVC, and the information required for the requested services. Service Request SRVREQ is optionally encrypted to Application Service 302 for Service SVC. Service Request SRVREQ may request one or more Service(s) SVC in a single request. Gateway Request GWREQ is comprised of Response Session Token RSTOKEN, Service SVC, Service Request SRVREQ, and the information required for the requested services routing. Gateway Request GWREQ is submitted to Response Gateway RGW 303. Response Gateway RGW 303 processes Gateway Request GWREQ. Gateway Request GWREQ is verified by validating Response Session Token RSTOKEN, requested Service(s) SVC, and matching the provided information. The use of Response Session Token RSTOKEN to access services may be restricted based on prior usage of the Response Session Token RSTOKEN.

In step 8, Response Gateway RGW 303 sends Service Request SRVREQ to the appropriate Application Service 302 for processing. If more than one Application Service 302 is available for processing, then Response Gateway RGW 303 selects an instance of Application Service 302 based on configuration and usage data obtained from other instances of Response Gateway RGW 303, Conductor CON 181, or other system resources. Application Service 302 processes Service Request SRVREQ. Service Request SRVREQ is decrypted as required. Service Request SRVREQ is verified by validating Service(s) SVC and matching the provided information. Response Session Token RSTOKEN is verified by validating signatures, Lifetime LTOKEN, Service(s) SVC, and matching the provided information. The use of Response Session Token RSTOKEN to access services may be restricted based on prior usage of the Response Session Token RSTOKEN. Application Service 302 appropriately processes Service Request SRVREQ and constructs Service Response SVCRSP that contains the result of the service process. Application Service 302 may utilize and optionally forward Service Request SRVREQ to other Application Services 302 for additional processing and results. Application Service 302 creates Service Response SVCRSP that is optionally signed by Application Service 302. Response Gateway RGW 303 may optionally construction Gateway Response GWRSP that is comprise of optional information retrieved from Data Feed FEED 339 such as System Information SYSINFO, Certificate Information CERTINFO, Gateway Information GWINFO, and Survey Information SURINFO. System Information SYSINFO is comprised of system information such as availability, number of participants, configuration, available services, and usage statistics. Certificate Information CERTINFO is comprised of the current certificates of authorized gateways and application services. Gateway Information GWINFO is comprised of loading balancing and connection information for use by Device DEV 202 in further interactions with gateways and application services. Survey Information SURINFO is comprised of survey related information such as active surveys, active survey results, completed surveys, and completed survey results. Service Response SRVRSP and/or Gateway Response GWRSP is returned to Device DEV 202 via Response Gateway RGW 303. Device DEV 202 that is under the control of Participant PAR 201 processes the Service Response SRVRSP. Service Response SRVRSP is validated and processed as appropriate for the requested Service SVC. Gateway Response GWRSP is validated and used to update configurations and information stored on Device DEV 202.

Figure 4:
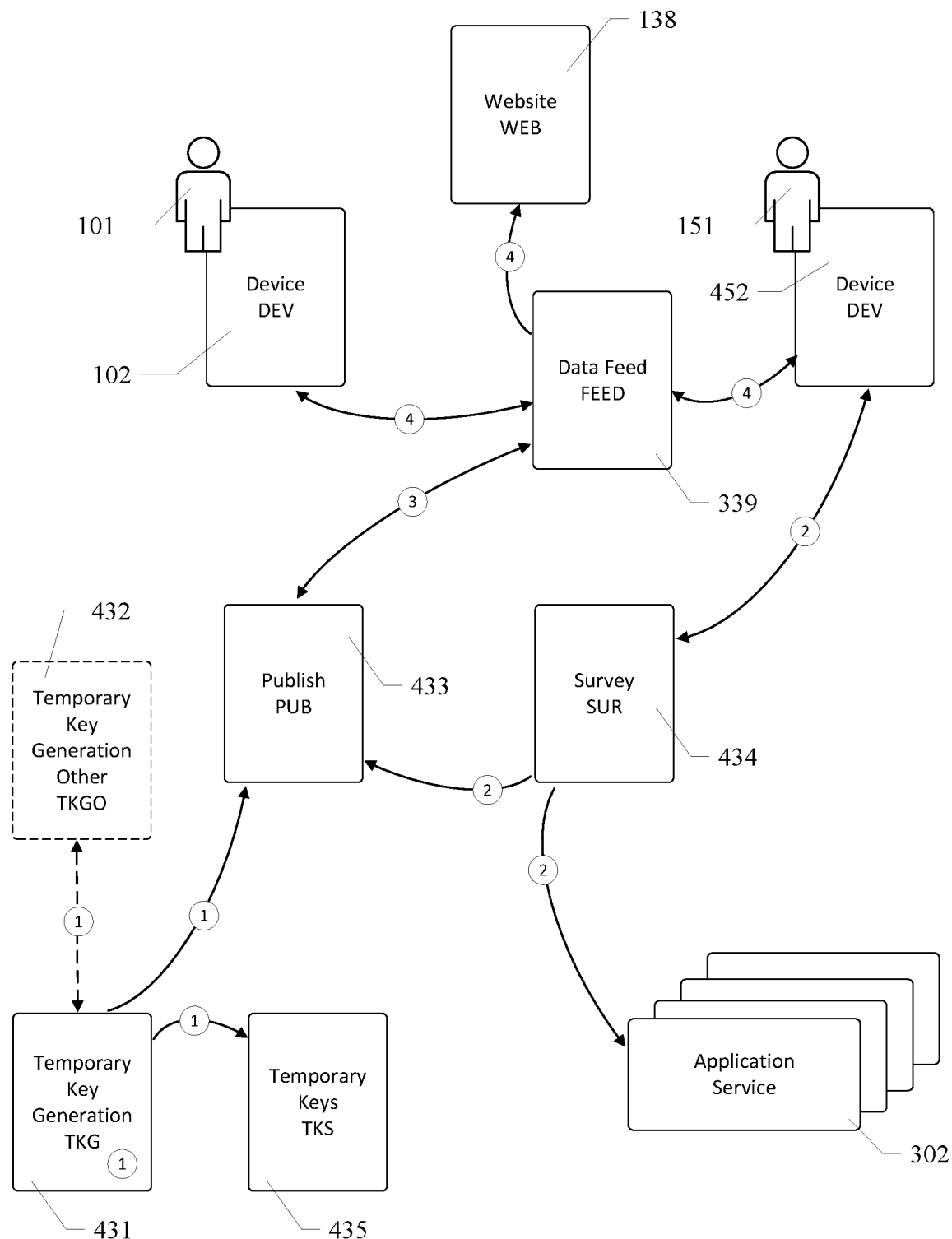
FIG. 4 shows a view of opinion poll preparation and data feed delivery for a system and method for reliable opinion polls according to an embodiment of the disclosed subject matter.

FIG. 4 shows a view of opinion poll preparation and data feed delivery for a system and method for reliable opinion polls. This FIG. describes an embodiment of temporary key generation and opinion poll creation. Step 1 presents one embodiment of a single or multi-party protocol to pre-generate temporary public/private key pairs, issue temporary digital certificates, and publish the commitment to the temporary key pairs and certificates. Step 1 may be performed at any time prior to the publication of an opinion poll. Step 2 to step 4 presents one embodiment in which an opinion poll is created, approved, and distributed to application services, participants, and web site. Satellite replicas may be configured with Temporary Key Packages TKP and/or Opinion Polls OP that have been created on a primary replica and transferred to the satellite replica. Although this FIG. describes an embodiment using a single instance of each service, multiple instances of services may be used to accomplish this embodiment. Numbers inside of a circle are included as a convenience to indicate steps in the described protocol. Lines with directional arrows are included to show the flow of information from one step to the next step. These steps and descriptions may have other embodiments that utilize additional or different devices, application servers, application services, steps, dataflow, data types, data parameters, algorithms, key lengths, proofs, and protocols to accomplish a similar outcome.

In step 1, Temporary Key Generation TKG 431 uses a single or multi-party protocol to pre-generate temporary public/private key pairs and issue corresponding digital certificates. Temporary public/private key pairs are single-use asymmetric key pairs that are used in a split-key signing protocol during a response as described in FIG. 5. Temporary public/private keys are generated, corresponding digital certificates are issued, and a commitment to those key pairs and certificates are published before the key pairs are used in an opinion poll. After the opinion poll is completed, the corresponding certificate for the temporary key pairs that are used in the opinion poll is published. Each temporary private key is split into a configurable number of private key portions such that a) all private key portions are required to create a valid digital signature, and b) the discovery of any private key portion does not lead to the discovery of any of the other private key portions. If a single-party protocol is used to generate temporary public/private key pairs, Temporary Key Generation TKG 431 creates a configurable number of Temporary Key Packages TKP. If a multi-party protocol is used to generate temporary public/private key pairs, Temporary Key Generation TKG 431 collaborates with one or more Temporary Key Generation Other(s) TKG 432 to create a configurable number of Temporary Key Packages TKP. Temporary Key Package TKP is comprised of a private key that is divided into a configurable number of private key portions one $PRIV_{TMP-D1}$, $PRIV_{TMP-D2}$, ... $PRIV_{TMP-Dn}$, each of which are encrypted to separate entities, and a corresponding digital certificate $CERT_{TMP}$ in which the Distinguished Name is comprised of a nonce. Each private key portion and $CERT_{TMP}$ is encrypted to separate entities. The associated certificate is hashed $H(CERT_{TMP})$ to create Temporary Key Hash TKH. In one embodiment described in this FIG. and FIG. 5, Temporary Key Package TKP is comprised of a) portion for Temporary Signing TS 534 as $E_{TS-C}(S_{TKG}(CERT_{TMP}))$, b) portion for Voting Participant 101 as $E_{TKS-C}(S_{TKG}(PRIV_{TMP-D1}))$, c) portion for Response Endpoint REP 535 as $E_{REP-C}(S_{TKG}(CERT_{TMP}, PRIV_{TMP-D2}))$, d) portion for Response Queue QUE 536 as $E_{QUE-C}(S_{TKG}(CERT_{TMP}, PRIV_{TMP-D3}))$, e) portion for Pick and Post PAP 537 as $E_{PAP-C}(S_{TKG}(CERT_{TMP}, PRIV_{TMP-D4}))$, and f) $E_{TKS-C}(S_{TKG}(Temporary Key Hash TKH))$. Temporary Key Generation TKG 431 creates Temporary Key Chain TKC by adding Temporary Key Hash TKH as Chain Content CC to Temporary Key Chain TKC. Temporary Key Chain TKC comprised of configurable number of Temporary Key Hashes TKH are signed as $S_{TKG}$(Temporary Key Chain TKC) and sent to Publish PUB 433 and Temporary Keys TKS 435. Temporary Key Generation TKG 431 sends Temporary Key Packages TKP to Temporary Keys TKS 435 for use in published opinion polls. Temporary Key Generation TKG 431 does not store Temporary Key Packages TKP or Temporary Key Chains TKC.

In step 2, Participant PAR 151 acting as an authorized opinion poll author uses Device DEV 452 to create Opinion Poll OP identified by Survey Id SID. Device DEV 452 is Device DEV 152 and/or Participant Application Programming Interface PARAPI 153 used by Participant PAR 151. Participant PAR 151 establishes a session with Survey SUR 434 using Session Token STOKEN. Participant PAR 151 collaborates with Survey SUR 434 to create a new Opinion Poll OP or to edit an existing Opinion Poll OP. Participant PAR 151 may collaborate with other participants to create and edit Opinion Poll OP in an iterative process to accomplish tasks such as feedback, comments, testing, editing, versioning, and approval of the Opinion Poll OP. When Opinion Poll OP is approved, Survey SUR 434 distributes Opinion Poll OP to services such as Application Service 302 and Publish PUB 433. Opinion Poll OP may be edited and re-published in an updated version as required.

In step 3, Publish PUB 433 provides Opinion Poll OP, final results of Opinion Poll OP, audit results of Opinion Poll OP, and other published data to Data Feed FEED 339 using either push or on-demand data delivery methodologies. Publish PUB 433 stores and provides current and historical configurations, responses, results, and audits for each Opinion Poll OP. Publish PUB 433 stores and provides any other publishable data. Data Feed FEED 339 may request non-cached data from Publish PUB 433.

In step 4, Data Feed FEED 339 provides Opinion Poll OP, results during the Opinion Poll OP, final results of Opinion Poll OP, audit results of Opinion Poll OP, and other published data to Voting Participant 101 using Device 102, Participant PAR 151 using Device DEV 452, and/or Website WEB 138 using either push or on-demand data delivery methodologies. Voting Participant 101 using Device 102, Participant PAR 151 using Device DEV 452, and/or Website WEB 138 may request non-Cached data from Data Feed FEED 339.

Figure 5:
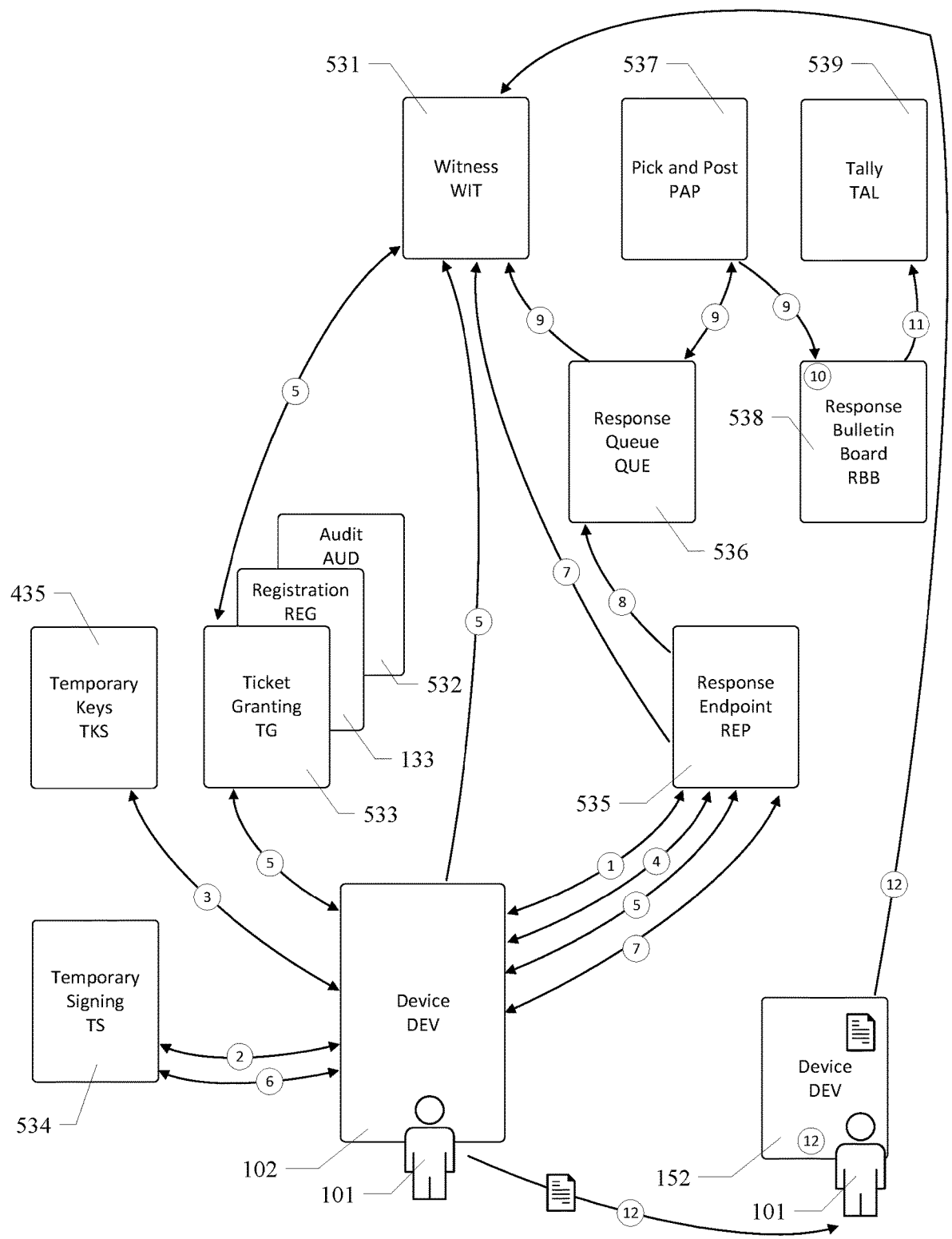
FIG. 5 shows a view of a participant response for a system and method for reliable opinion polls according to an embodiment of the disclosed subject matter.
Figure 6:
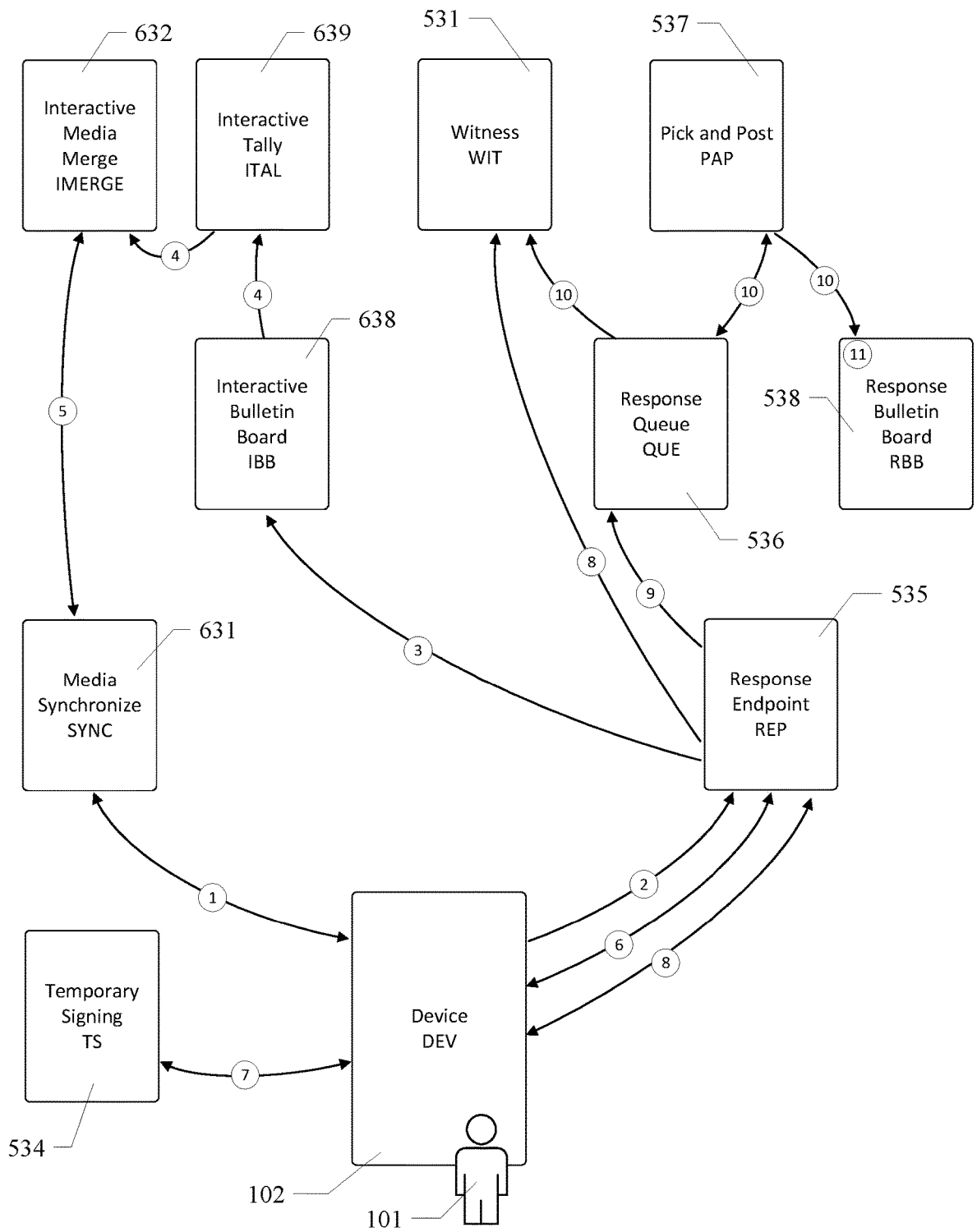
FIG. 6 shows a view of interactive participant responses for a system and method for reliable opinion polls according to an embodiment of the disclosed subject matter.

FIG. 5 shows a view of a participant response for a system and method for reliable opinion polls. This figure describes an embodiment of a Voting Participant VPAR response in which Voting Participant VPAR 101 uses Device DEV 102 or a voting station to prepare a response that is submitted anonymously. Prior to submitting Response RSP, Voting Participant VPAR 101 has created Response RSP to a Survey Id SID that has been received from Data Feed FEED 339 described in FIG. 4. Voting Participant VPAR 101 has obtained valid session tokens described in FIG. 3 as a pre-Condition to this process. A participant response may be submitted in multiple independent responses that are similarly authenticated but are independent collections of data. For example, a participant response may consist of two separate responses in which one response contains the participant's answers to the survey questions and another response contains the participant's characteristics such as political party, philosophy, race, gender, and age. Both responses are identified with the selected Survey Id SID and other classifying information. This construct can be extended to additional types of segregated response data as required. This FIG. describes an embodiment of submitting a participant response. FIG. 6 describes an embodiment that extends and augments the steps of this FIG. to include additional steps for constructing and submitting an interactive response. Voting Participant VPAR 101 requests access to gateways and application services by using Session Token STOKEN or Response Session Token RSTOKEN obtained in FIG. 3 step 4. Sequence SEQ is a number initiated in this FIG. to give a sense of the order of operations for responses and interactive responses. Sequence SEQ is incremented before each new response or interactive response in in FIG. 5 and FIG. 6 steps. Not shown in this figure, additional authenticating credentials or tokens in the form of quantity, group, unique, time limited representations of acceptable authentication, or participant biometrics may be required as a condition of participating in a particular opinion poll. Credentials may be securely transmitted to application services for additional credential validation. A satellite replica may use primary replica instances of Pick and Post PAP 537 and associated Response Bulletin Board Group RBBG comprised of one or more Response Bulletin Boards RBB 538 in place of or in addition to satellite replica instances of Pick and Post PAP 537 and Response Bulletin Boards RBB 538. When an opinion poll is an election, a satellite replica may use additional satellite instances of Pick and Post PAP 537 and associated Response Bulletin Board Group RBBG comprised of one or more Response Bulletin Boards RBB 538 that are exclusively available to a satellite manager. When an opinion poll is an election, Tally TAL 539 operations may be delayed until after the election is closed and no longer receiving responses. Although this FIG. describes an embodiment using a single instance of each service, multiple instances of services may be used to accomplish this embodiment. Numbers inside of a circle are included as a convenience to indicate steps in the described protocol. Lines with directional arrows are included to show the flow of information from one step to the next step. These steps and descriptions may have other embodiments that utilize additional or different devices, application servers, application services, steps, dataflow, data types, data parameters, algorithms, key lengths, proofs, and protocols to accomplish a similar outcome.

In step 1, Voting Participant VPAR 101 establishes a session with Response Endpoint REP 535 using Response Session Token RSTOKEN and sends Survey Id SID and a nonce to Response Endpoint REP 535 without identifying information. Response Endpoint REP 535 validates the Response Session Token RSTOKEN and Survey Id SID. Response Endpoint REP 535 returns $CERT_{REP}$ and $S_{REP}$ (Survey Id SID, nonce) to Voting Participant VPAR 101. Voting Participant VPAR 101 checks $V_{REP}$(Survey Id SID, nonce).

In step 2, Voting Participant VPAR 101 establishes a session with Temporary Signing TS 534 using Response Session Token RSTOKEN and sends $CERT_{REP}$, Survey Id SID, and another nonce to Temporary Signing TS 534 without identifying information. Temporary Signing Service 534 validates the Response Session Token RSTOKEN and Survey Id SID. Temporary Signing TS 534 returns $CERT_{TS}$ and $S_{TS}$(Survey Id SID, nonce) to Voting Participant VPAR 101. Voting Participant VPAR 101 checks $V_{TS}$(Survey Id SID, nonce).

In step 3, Voting Participant VPAR 101 establishes a session with Temporary Keys TKS 435 using Response Session Token RSTOKEN and sends data to Temporary Keys TKS 435, the data comprising $CERT_{REP}$, $S_{REP}$(Survey Id SID, nonce), $CERT_{TS}$, and $S_{TS}$(Survey Id SID, nonce). Temporary Keys TKS 435 checks $V_{REP}$(Survey Id SID, nonce) and $V_{TS}$(Survey Id SID, nonce). Temporary Keys TKS 435 arbitrarily selects a Temporary Key Package TKP that has been published as described in FIG. 4 step 1. The portion of the Temporary Key Package TKP for Response Endpoint REP 535 is further encrypted with $CERT_{REP}$. The portion of the Temporary Key Package TKP for Temporary Signing Service 534 is further encrypted with $CERT_{TS}$. The portion of the Temporary Key Package TKP for Voting Participant VPAR 101 is decrypted with $PRIV_{TKS-C}$ and signed with $PRIV_{TKS}$. The selected Temporary Key Package TKP is marked as used by storing $S_{TKS}$(Temporary Key Hash TKH, $CERT_{REP}$, $S_{REP}$(Survey Id SID, nonce)) to be published later. Temporary Key Package TKP is returned to Voting Participant VPAR 101. Voting Participant VPAR 101 checks the signature on the portion of the data for Voting Participant VPAR 101. Temporary Key Packages TKP that have been used are retained for publishing and auditing purposes.

In step 4, Voting Participant VPAR 101 sends the Response Endpoint REP 535 portion of Temporary Key Package TKP to Response Endpoint REP 535. Response Endpoint REP 535 decrypts its portion of Temporary Key Package TKP using $PRIV_{REP}$ and $PRIV_{REP-C}$ and then validates the signatures. Response Endpoint REP 535 constructs a Blinded Voting Ticket BTKT1 by creating an unsigned Voting Ticket TKT comprised of a hash of Survey Id SID, $CERT_{TMP}$, and ticket nonce, and then blinding it with Blinding Factor BF1 using a blinding operation of a blind signature protocol. Response Endpoint REP 535 optionally signs Blinded Voting Ticket BTKT1 and then returns Blinded Voting Ticket BTKT1 to Voting Participant VPAR 101.

In step 5, Voting Participant VPAR 101 constructs a Blinded Voting Ticket BTKT2 by further blinding Blinded Voting Ticket BTKT1 with Blinding Factor BF2 using a blinding operation of a blind signature protocol. Voting Participant VPAR 101 establishes a session with Ticket Granting TG 533 using Session Token STOKEN and sends $S_{PAR}$(Participant PID, Survey Id SID, Blinded Voting Ticket BTKT2) and $CERT_{PAR}$ to Ticket Granting TG 533. Ticket Granting TG 533 validates the Session Token STOKEN and checks $V_{PAR}$(Participant Id PID, Survey Id SID, Blinded Voting Ticket BTKT2). Ticket Granting TG 533 sends $S_{PAR}$(Participant PID, Survey Id SID, Blinded Voting Ticket BTKT2) and $CERT_{PAR}$ to Registration REG 133 to validate CERTPAR and check the eligibility and previous authorizations for Participant Id PID for Survey Id SID. If Registration REG 133 validates the request, Registration REG 133 encrypts $E_{WTT}(S_{PAR}$(Participant Id PID, Survey Id SID, Blinded Voting Ticket BTKT2)) and sends to at least one Witness WIT 531 where it is included as Chain Content CC in a Witness Chain WC. Registration REG 133 validates sends the request status to Ticket Granting TG 533. If the data is successfully validated and approved, Ticket Granting TG 533 creates $S_{TG}$(Blinded Voting Ticket BTKT2). Ticket Granting TG 533 encrypts $E_{WTT}(S_{PAR}$(Participant Id PID, Survey Id SID, Blinded Voting Ticket BTKT2), $S_{TG}$(Blinded Voting Ticket BTKT2)) and sends to at least one Witness WIT 531 where it is included as Chain Content CC in a Witness Chain WC. Ticket Granting TG 533 adds $S_{TG}(S_{PAR}$ (Participant Id PID, Survey Id SID, Blinded Voting Ticket BTKT2), $S_{TG}$(Blinded Voting Ticket BTKT2)) as Chain Content CC to a Ticket Chain TC of issued tickets to be published later. Ticket Granting TG 533 returns $S_{TG}$(Blinded Voting Ticket BTKT2) to Voting Participant VPAR 101. Voting Participant VPAR 101 validates $V_{TG}$(Blinded Voting Ticket BTKT2), unblinds Blinded Voting Ticket BTKT2 using Blinding Factor BF2 resulting in Blinded Voting Ticket BTKT1, and validates $V_{TG}$(Blinded Voting Ticket BTKT1). If Remediation Mode is disabled for the system, then Voting Participant Remediation VPR will comprise $E_{REM}$(nonce, nonce). If Remediation Mode is enabled for the system and Remediation Mode is enabled for the opinion poll identified by Survey Id SID, then Voting Participant Remediation VPR will comprise $E_{REM}$(Blinding Factor BF2, Blinded Voting Ticket BTKT1). If Remediation Mode is enabled for the system and Remediation Mode is disabled for the opinion poll identified by Survey Id SID, then Voting Participant Remediation VPR will comprise a) $E_{REM}$(Blinding Factor BF2, Blinded Voting Ticket BTKT1) for Voting Participant VPAR 101 identified as a test participant, b) $E_{REM}$(Blinding Factor BF2, Blinded Voting Ticket BTKT1) for Voting Participant VPAR 101 that opts in to response auditing, or c) $E_{REM}$(nonce, nonce) for Voting Participant VPAR 101 not identified as a test participant. Voting Participant VPAR 101 encrypts $E_{WTI}(S_{PAR}$(Participant Id PID, Survey Id SID, Blinded Voting Ticket BTKT2), $S_{TG}$(Blinded Voting Ticket BTKT2), Voting Participant Remediation VPR) and sends to at least one Witness WIT 531 where it is included as Chain Content CC in a Witness Chain WC. Voting Participant VPAR 101 sends $S_{TG}$(Blinded Voting Ticket BTKT1) to Response Endpoint REP 535. Response Endpoint REP 535 validates $V_{TG}$(Blinded Voting Ticket BTKT1), unblinds Blinded Voting Ticket BTKT1 using Blinding Factor BF1 resulting in a signed Voting Ticket TKT, and validates $V_{TG}$(Voting Ticket TKT). Response Endpoint REP 535 sends $E_{AUD}(S_{TG}$(Voting Ticket TKT)) to Voting Participant VPAR 101. If Survey Id SID is a ballot in an election, Hardcopy Auditing Response HAR may be created and printed for visual inspection by Voting Participant VPAR 101. Hardcopy Auditing Response HAR is comprised of a) encoded data that comprises $E_{AUD}(S_{TG}$(Voting Ticket TKT)) and Response RSP that are typically represented as barcodes, and b) a human-readable form of Response RSP. Hardcopy Auditing Response HAR is printed on physical media by Device 102, a voting station, or other device for review and approval by Voting Participant VPAR 101. If Hardcopy Auditing Response HAR is approved by Voting Participant VPAR 101, then the response process continues in step 6. Voting Participant VPAR 101 may edit Response RSP, print Hardcopy Auditing Response HAR for review until it is approval by Voting Participant VPAR 101. Hardcopy Auditing Response HAR is set aside for use in step 12.

In step 6, Voting Participant VPAR 101 and Temporary Signing TS 534 perform a portion of the work required to complete a split-key multi-party signing operation. Voting Participant VPAR 101 increments Sequence SEQ and creates an Interactive Session Key ISK comprised of a sufficiently large nonce. Voting Participant VPAR 101 performs H(Survey Id SID, Sequence SEQ, Response RSP, Interactive Session Key ISK) to create Response Hash RH. Voting Participant VPAR 101 validates signatures and uses a D1 portion of $PRIV_{TMP}$ to perform a portion of the signature on the Response Hash RH. Voting Participant VPAR 101 sends Partial $S_{TMP}$(Response Hash RH) and $E_{TS}$(Temporary Signing TS 534 portion of Temporary Key Package TKP) to Temporary Signing TS 534. Temporary Signing TS 534 decrypts $E_{TS}$(Temporary Signing TS 534 portion of Temporary Key Package TKP) and validates the signatures. Temporary Signing TS 534 uses a public modulus portion included in the Temporary Key Package TKP to perform a portion of the signature on the Response Hash RH and returns $E_{REP}$(Partial $S_{TMP}$(Response Hash RH)) to Voting Participant VPAR 101. If the Survey Id SID is an interactive opinion poll, Temporary Signing TS 534 encrypts $E_{TS\text{-}C}$(Temporary Signing TS 534 portion of Temporary Key Package TKP) and returns to Voting Participant VPAR 101.

In step 7, Voting Participant VPAR 101 sends $E_{REP}$(Partial $S_{TMP}$(Response Hash RH)), $E_{RBB\text{-}C}$(Survey Id SID, Sequence SEQ, Response RSP), $E_{RBB\text{-}C}$(Interactive Session Key ISK), and Response Endpoint REP 535, Response Queue QUE 536, and Pick and Post PAP 537 portions of Temporary Key Package TKP to Response Endpoint REP 535. Response Endpoint REP 535 decrypts $D_{REP}$(Partial $S_{TMP}$(Response Hash RH)), $D_{REP}(D_{REP\text{-}C}$(Response Endpoint REP 535 portion of Temporary Key Package TKP)), validates the signatures, and uses a D2 portion of $PRIV_{TMP}$ to perform a portion of the signature on the Response Hash RH resulting in Partial $S_{TMP}$(Response Hash RH). If Remediation Mode is disabled for the system, Response Endpoint Remediation RER will comprise $E_{REM}$(nonce). If Remediation Mode is enabled for the system, Response Endpoint Remediation RER will comprise $E_{REM}$(Blinding Factor BF1). Response Endpoint REP 535 encrypts $E_{WTI}(S_{TG}$(Voting Ticket TKT), Survey Id SID, Sequence SEQ, $CERT_{TMP}$, ticket nonce, Response Endpoint Remediation RER) and sends to at least one Witness WIT 531 where it is included as Chain Content CC in a Witness Chain WC. Response Endpoint REP 535 sends status information to Voting Participant VPAR 101. If the Survey Id SID is an interactive opinion poll, Response Endpoint REP 535 constructs Interactive Response Package IRP as $E_{REP\text{-}C}(S_{TG}$(Voting Ticket TKT), Survey Id SID, Response Endpoint REP 535, Response Queue QUE 536, and Pick and Post PAP 537 portions of Temporary Key Package TKP) and sends Interactive Response Package IRP to Voting Participant VPAR 101.

In step 8, Response Endpoint REP 535 sends $S_{TG}$(Voting Ticket TKT), Survey Id SID, ticket nonce, Partial $S_{TMP}$(Response Hash RH), $E_{RBB\text{-}C}$(Survey Id SID, Sequence SEQ, Response RSP), $E_{RBB\text{-}C}$(Interactive Session Key ISK), and Response Queue QUE 536 and Pick and Post PAP 537 portions of Temporary Key Package TKP to Response Queue QUE 536. Response Queue QUE 536 validates $V_{TG}$(Voting Ticket TKT). Response Queue QUE 536 decrypts $D_{QUE\text{-}C}$(Response Queue QUE 536 portion of Temporary Key Package TKP), validates the signatures, and uses a D3 portion of $PRIV_{TMP}$ to perform a portion of the signature on the Response Hash RH resulting in Partial $S_{TMP}$(Response Hash RH). Response Queue QUE 536 stores and queues a configurable number of Response Queue Packages RQP for delivery to Pick and Post PAP 537 in step 9. A Response Que Package RQP comprises $S_{TG}$(Voting Ticket TKT), Survey Id SID, ticket nonce, Partial $S_{TMP}$(Response Hash RH), $E_{RBB\text{-}C}$(Survey Id SID, Sequence SEQ, Response RSP), $E_{RBB\text{-}C}$(Interactive Session Key ISK), and Pick and Post PAP 537 portions of Temporary Key Package TKP.

In step 9, Pick and Post PAP 537 requests a Response Queue Package RQP from Response Queue QUE 536 and for delivery to a Response Bulletin Board Group RBBG comprised of one or more Response Bulletin Boards RBB 538. Response Queue QUE 536 randomly selects a configurable number of Response Queue Packages RQP that have not already been posted to the specified Response Bulletin Board Group RBBG, retrieves some unique information from each Response Queue Package RQP, and delivers the list of unique information to Pick and Post PAP 537. Pick and Post PAP 537 selects one item in the list of unique information and returns the unique information to Response Queue QUE 536. Response Queue QUE 536 uses the unique information to locate the selected Response Queue Package RQP, mark the Response Queue Package RQP as provided to Response Bulletin Board Group RBBG, and sends the Response Queue Package RQP to Pick and Post PAP 537. In the case that the Response Queue Package RQP is found to already have been delivered to Response Bulletin Board Group RBBG, then Pick and Post PAP 537 is directed to make another selection. For each Pick and Post PAP 537 Response Queue Package RQP that is selected, Response Queue QUE 536 encrypts $E_{WTT}(S_{TG}$(Voting Ticket TKT), Pick and Post PAP 537 instance, Response Bulletin Board Group RBBG) and sends to at least one Witness WIT 531 where it is included as Chain Content CC in a Witness Chain WC. Response Queue Package RQP may be delivered to more than one Response Bulletin Board Group RBBG. One or more Response Bulletin Board Groups RBBG may be operated by a third party for auditing purposes. After the Response Queue Package RQP is delivered to all Response Bulletin Board Groups RBBG, the Response Queue Package RQP may be archived for future auditing. Response Queue QUE 536 may not provide information to Pick and Post PAP 537 requests until a configurable number of Response Queue Packages RQP have been queued. Pick and Post PAP 537 validates $V_{TG}$(Voting Ticket TKT). Pick and Post PAP 537 decrypts $D_{PAP-C}$(Pick and Post PAP 537 portion of Temporary Key Package TKP), validates the signatures, and uses a D4 portion of $PRIV_{TMP}$ to perform a portion of the signature on the Response Hash RH resulting in $S_{TMP}$(Response Hash RH). Pick and Post PAP 537 sends $S_{TG}$(Voting Ticket TKT), Survey Id SID, Sequence SEQ, ticket nonce, $S_{TMP}$(Response Hash RH), $E_{RBB-C}$(Survey Id SID, Sequence SEQ, Response RSP), $E_{RBB-C}$(Interactive Session Key ISK), to a Response Bulletin Board RBB 538 in Response Bulletin Board Group RBBG.

In step 10, Response Bulletin Board RBB 538 validates $V_{TG}$(Voting Ticket TKT), $V_{TMP}$(Response Hash RH), Response Hash RH, decrypts $D_{RBB-C}$(Survey Id SID, Sequence SEQ, Response RSP), decrypts $D_{RBB-C}$(Interactive Session Key ISK), and checks all information for consistency and correctness. Response Bulletin Board RBB 538 validates Response RSP for correctness for Survey Id SID. Response Bulletin Board RBB 538 stores $S_{RBB}(S_{TG}$(Voting Ticket TKT), Survey Id SID, Sequence SEQ, ticket nonce, $S_{TMP}$(Response Hash RH), $E_{RBB-C}$(Survey Id SID, Sequence SEQ, Response RSP), $E_{RBB-C}$(Interactive Session Key ISK), optionally Response RSP) and adds as Chain Content to Response Chain RC. Response Bulletin Board RBB 538 encrypts $E_{IBB-C}$(Interactive Session Key ISK) and posts $S_{TG}$(Voting Ticket TKT) and $E_{IBB-C}$(Interactive Session Key ISK) to a datastore accessible to Interactive Bulletin Board RBB 638 instances described in FIG. 6.

In step 11, Response Bulletin Board RBB 538 may send Survey Id SID and Response RSP to Tally TAL 539 while the opinion poll is active. When Tally TAL 539 receives Response RSP, Survey Id SID is used to interpret Response RSP into answers and appropriately accumulate the information contained in Response RSP. Tally TAL 539 sends substantially real-time results and totals for Survey Id SID, final results and totals for Survey Id SID, and other information appropriate for Survey Id SID to Data Feed FEED 339 described in FIG. 4.

In step 12, if Survey Id SID is a ballot in an election, Hardcopy Auditing Response HAR may be scanned and interpreted by Device DEV 152 acting as a voting scan station. Voting Participant VPAR 101 or someone assisting them uses Device DEV 152 acting as a voting scan station to scan Hardcopy Auditing Response HAR. Device DEV 152 recognizes any barcodes and optionally recognizes the human-readable Response RSP and compares the encoded Response RSP with the human-readable RSP. The Hardcopy Auditing Response HAR is retained in a lockbox for future auditing purposes. Device DEV 152 acting as a voting scan station encrypts $E_{WTT}(S_{DEV}$(Hardcopy Auditing Response HAR encoded, decoded, recognized human-readable, and optional scanned image)) and sends to at least one Witness WIT 531 where it is included as Chain Content CC in a Witness Chain WC.

FIG. 6 shows a view of an interactive participant response for a system and method for reliable opinion polls. This figure describes an embodiment of a Voting Participant $V_{PAR}$ interactive response which describes additional steps that extend and augment the steps described in FIG. 5. Voting Participant VPAR 101 uses Device DEV 102 to prepare interactive responses that are submitted anonymously. Step 1 describes functionality for finding the location of a fragment of a media content within the media content source and may be repeated in coordination with other steps as necessary during the interactive opinion poll. Step 1 may be performed as Voting Participant VPAR 101 enters, leaves, pauses, resumes, or changes location during an interactive opinion poll. Steps 2 to 5 describes functionality for submitting interactive responses with a minimum amount of delay between collecting and tallying an interactive response from Voting Participant VPAR 101. Steps 2 to 5 may be performed any time that one or more interactive responses are collected from Voting Participant VPAR 101 and may be repeated in coordination with other steps as necessary during the interactive opinion poll. Steps 6 to 11 describes functionality for submitting a signed hash of one or more interactive responses to validate that complete and correct interactive responses have been recorded and tallied during the interactive opinion poll. Steps 6 to 11 may be repeatedly performed any time and may be repeated in coordination with other steps as necessary during the interactive opinion poll. Optimally, Steps 6 to 11 may be repeatedly performed as Voting Participant VPAR 101 enters, leaves, pauses, resumes, responds, or changes location during an interactive opinion poll. Steps 2 to 5 and steps 6 to 11 may be performed in the same execution process or independently in different execution processes. Steps 2 to 5 and steps 6 to 11 may work in coordination with the same instance of Response Endpoint REP 535 or may use separate instances of Response Endpoint REP 535. Sequence SEQ is a number initiated in FIG. 5 steps to give a sense of the order of operations for responses and interactive responses. Sequence SEQ is incremented before each new response or interactive response in in FIG. 5 and FIG. 6 steps. Although this FIG. describes an embodiment using a single instance of each service, multiple instances of services may be used to accomplish this embodiment. Numbers inside of a circle are included as a convenience to indicate steps in the described protocol. Lines with directional arrows are included to show the flow of information from one step to the next step. These steps and descriptions may have other embodiments that utilize additional or different devices, application servers, application services, steps, dataflow, data types, data parameters, algorithms, key lengths, proofs, and protocols to accomplish a similar outcome.

In step 1, Voting Participant VPAR 101 establishes a session with Media Synchronize SYNC 631 using Response Session Token RSTOKEN and sends Media Id MID to Media Synchronize SYNC 631 without identifying information. Voting Participant VPAR 101 selects media Id MID from allowable sources as described in the interactive opinion poll. Media Synchronize SYNC 631 validates the Response Session Token RSTOKEN and Media Id MID. Media Id MID identifies media content and may be a system configured designator or a URL that uniquely identifies media content. Media Synchronize SYNC 631 includes the functionality of comparing a fragment of media content to a source that contains that media content to identify the location of the fragment within the source media. The location within the media content can be variously designated by absolute or relative frames, times, offsets, or other type of measurement. Voting Participant VPAR 101 collects a fragment of media content using Device DEV 102 resources such as a microphone or streaming content identified by Media Id MID. Voting Participant VPAR 101 sends the media fragment and other optional information to Media Synchronize SYNC 631. Media Synchronize SYNC 631 uses media matching algorithms and/or services to identify the location of the media fragment within the source media content identified by Media Id MID. Matching algorithms perform matching functions using media information such as audio waveforms, speech recognition, and video content. Typically, matching is performed using schemes that a) capture or obtain media fragment to be located, b) convert any analog media to a digital media fragment, c) create a fingerprint of the digital media fragment often performing a conversion to the frequency domain, d) use a media recognition algorithm to match the fingerprint to a known or unknown media source, and e) find the location of the media fragment in the source media. The location of the media fragment and other optional location and confidence information is returned to Voting Participant VPAR 101 and is used to correlate Interactivate Response IRSP to the media content timeline in step 2. If Voting Participant VPAR 101 is responding at an in-person event, Voting Participant VPAR 101 will typically not send a media fragment to Media Synchronize SYNC 631, but will instead send a media fragment tagged with a reference starting and/or ending time to Response Endpoint REP 535 as part of the interactive response in step 2. Voting Participant VPAR 101 repeats step 1 as necessary and prudent during the interactive opinion poll to sustain a close correlation between a portion of media content and Voting Participant VPAR 101 responses to that portion of media content.

In step 2, Voting Participant VPAR 101 establishes a session with Response Endpoint REP 535 using Response Session Token RSTOKEN and sends Survey Id SID and a nonce to Response Endpoint REP 535 without identifying information. Response Endpoint REP 535 validates the Response Session Token RSTOKEN and Survey Id SID. Response Endpoint REP 535 returns $CERT_{REP}$ and $S_{REP}$ (Survey Id SID, nonce) to Voting Participant VPAR 101. Voting Participant VPAR 101 checks $V_{REP}$(Survey Id SID, nonce). Voting Participant VPAR 101 collects one or more Interactive Responses IRSP and increments Sequence SEQ to create a new Sequence SEQ. Participant VPAR 101 is optionally configured to record Interactive Responses IRSP based on criteria such as the amount of change in an Interactive Response IRSP since the previous Interactive Response IRSP. Participant VPAR 101 is optionally configured to submit Interactive Responses IRSP based on criteria such as the amount of change in an Interactive Response IRSP since the previous Interactive Response IRSP. For in-person events, Interactive Response IRSP may include a media fragment as described in step 1. Voting Participant VPAR 101 performs H(Survey Id SID, Sequence SEQ, one or more Interactive Responses IRSP, Previous Interactive Response Hash PIRH) to create Interactive Response Hash IRH, which is saved as Previous Interactive Response Hash PIRH to be used with the next Sequence SEQ. Voting Participant VPAR 101 submits $E_{REP}$(Interactive Response Package IRP, Survey Id SID, Sequence SEQ, $E_{ISK}$(one or more Interactive Responses IRSP, Previous Interactive Response Hash PIRH)) to Response Endpoint REP 535. Response Endpoint REP 535 decrypts $E_{REP}$(Interactive Response Package IRP, Survey Id SID, Sequence SEQ, $E_{ISK}$(one or more Interactive Responses IRSP, Previous Interactive Response Hash PIRH)) and Interactive Response Package TRP. Response Endpoint REP 535 retrieves $S_{TG}$ (Voting Ticket TKT) and Survey Id SID from Interactive Response Package IRP and validates $V_{TG}$(Voting Ticket TKT), Survey Id SID, and Sequence SEQ. Response Endpoint REP 535 may send the media fragment to Media Synchronize SYNC 631 to determine the source location if a media source is available.

In step 3, Response Endpoint REP 535 sends $S_{TG}$(Voting Ticket TKT), Survey Id SID, Sequence SEQ, $E_{ISK}$(one or more Interactive Responses IRSP, Previous Interactive Response Hash PIRH) to at least one Interactive Bulletin Board IBB 638. More than one Interactive Bulletin Board IBB 638 may be used for auditing purposes. Interactive Bulletin Board IBB 638 validates $V_{TG}$(Voting Ticket TKT), Survey Id SID, and Sequence SEQ. Interactive Bulletin Board IBB 638 uses Voting Ticket TKT to retrieve and decrypt $D_{IBB-C}$(Interactive Session Key ISK) from a common datastore. Interactive Bulletin Board IBB 638 uses Interactive Session Key ISK to decrypt $D_{ISK}$(one or more Interactive Responses IRSP, Previous Interactive Response Hash PIRH). Interactive Bulletin Board IBB 638 checks all Interactive Responses IRSP information for consistency and correctness, optionally validating Previous Interactive Response Hash PIRH. Interactive Bulletin Board IBB 638 validates all Interactive Responses IRSP for correctness for Survey Id SID. Interactive Bulletin Board IBB 638 stores $S_{TG}$(Voting Ticket TKT), Survey Id SID, Sequence SEQ, $E_{ISK}$(one or more Interactive Responses IRSP, Previous Interactive Response Hash PIRH) and adds as Chain Content CC to Interactive Response Chain IRC.

In step 4, Interactive Bulletin Board IBB 638 sends Survey Id SID and Interactive Responses IRSP to Interactive Tally ITAL 639. When Interactive Tally ITAL 639 receives an Interactive Response IRSP, Survey Id SID is used to interpret and appropriately accumulate the information contained in Interactive Response IRSP. Interactive Tally ITAL 639 uses configurable units of measure to collect and accumulate information into discrete units of information. In one embodiment, Interactive Responses IRSP that are collected during a configurable unit of time are accumulated together to create one or more discrete units of information. In another embodiment, Interactive Responses IRSP that are collected during a configurable range of media content frames are accumulated together to create one or more discrete units of information. Other embodiments of accumulation functions may be used to create desired outcomes. Interactive Tally ITAL 639 sends substantially real-time results and totals for Survey Id SID, final results and totals for Survey Id SID, and other information appropriate for Survey Id SID to Data Feed FEED 339 described in FIG. 4 and optionally to Interactive Media Merge IMERGE 632.

In optional step 5, Interactive Media Merge IMERGE 632 merges the results from Interactive Tally ITAL 639 and source media content thus creating annotated media content that is sent to Data Feed FEED 339 described in FIG. 4. Interactive Media Merge IMERGE 632 obtains the media content for the interactive opinion poll from an appropriate source for Media Id MID. Interactive Media Merge IMERGE 632 collects a media fragment from the source media content and sends the media fragment and other optional information to Media Synchronize SYNC 631. Media Synchronize SYNC 631 uses media matching algorithms and/or services to identify the location of the media fragment within the source media content identified by Media Id MID. The location of the media fragment and other optional location and confidence information is returned to Interactive Media Merge IMERGE 632. Interactive Media Merge IMERGE 632 repeats media synchronization as necessary and prudent during the interactive opinion poll to sustain a close correlation between Interactive Tally ITAL 639 results and source media. Interactive Tally ITAL 639 results are merged with the source media using synchronization information to correlate Interactive Tally ITAL 639 results to the timeline of the source media. Interactive Tally ITAL 639 results are merged with the source media content using configurable templates and presentation designs. Interactive Tally ITAL 639 results can be merged with the source media using written, auditory, and/or visual presentations.

In step 6, Voting Participant VPAR 101 establishes a session with Response Endpoint REP 535 using Response Session Token RSTOKEN and sends Survey Id SID and a nonce to Response Endpoint REP 535 without identifying information. Response Endpoint REP 535 validates the Response Session Token RSTOKEN and Survey Id SID. Response Endpoint REP 535 returns $CERT_{REP}$ and $S_{REP}$ (Survey Id SID, nonce) to Voting Participant VPAR 101. Voting Participant VPAR 101 checks $V_{REP}$(Survey Id SID, nonce).

In step 7, Voting Participant VPAR 101 establishes a session with Temporary Signing TS 534 using Response Session Token RSTOKEN and sends $CERT_{REP}$, Survey Id SID, and nonce to Temporary Signing TS 534 without identifying information. Temporary Signing Service 534 validates the Response Session Token RSTOKEN and Survey Id SID. Temporary Signing TS 534 returns $CERT_{TS}$ and $S_{TS}$(Survey Id SID, nonce) to Voting Participant VPAR 101. Voting Participant VPAR 101 checks $V_{TS}$(Survey Id SID, nonce). Voting Participant VPAR 101 and Temporary Signing TS 534 perform a portion of the work required to complete a split-key multi-party signing operation. Voting Participant VPAR 101 increments Sequence SEQ to create a new Sequence SEQ. Voting Participant VPAR 101 performs H(Survey Id SID, Sequence SEQ, Previous Interactive Response Hash PIRH) to create Response Hash RH. Voting Participant VPAR 101 validates signatures and uses a D1 portion of $PRIV_{TMP}$ to perform a portion of the signature on the Response Hash RH. Voting Participant VPAR 101 sends Partial $S_{TMP}$(Response Hash RH) and $E_{TS-C}$(Temporary Signing TS 534 portion of Temporary Key Package TKP) to Temporary Signing TS 534. Temporary Signing TS 534 decrypts $E_{TS-C}$(Temporary Signing TS 534 portion of Temporary Key Package TKP) and validates signatures. Temporary Signing TS 534 uses a public modulus portion included in the Temporary Key Package TKP to perform a portion of the signature on the Response Hash RH and returns $E_{REP}$(Partial $S_{TMP}$(Response Hash RH)) to Voting Participant VPAR 101.

In step 8, Voting Participant VPAR 101 sends $E_{REP}$ (Partial $S_{TMP}$(Response Hash RH)) and $E_{REP}$(Interactive Response Package IRP, Survey Id SID, Sequence SEQ, Previous Interactive Response Hash PIRH)) to Response Endpoint REP 535. Response Endpoint REP 535 decrypts $E_{REP}$(Interactive Response Package IRP, Survey Id SID, Sequence SEQ, Previous Interactive Response Hash PIRH) and Interactive Response Package TRP. Response Endpoint REP 535 retrieves $S_{TG}$(Voting Ticket TKT), $E_{REP-C}$(Response Endpoint REP 535 portion of Temporary Key Package TKP), and Survey Id SID from Interactive Response Package IRP and validates $V_{TG}$(Voting Ticket TKT), Survey Id SID, and Sequence SEQ. Response Endpoint REP 535 decrypts $D_{REP}$(Partial $S_{TMP}$(Response Hash RH)), $D_{REP-C}$ (Response Endpoint REP 535 portion of Temporary Key Package TKP), validates the signatures, and uses a D2 portion of $PRIV_{TMP}$ to perform a portion of the signature on the Response Hash RH resulting in Partial $S_{TMP}$(Response Hash RH). Response Endpoint REP 535 encrypts $E_{WIT}$($S_{TG}$ (Voting Ticket TKT), Survey Id SID, Sequence SEQ, $CERT_{TMP}$) and sends to at least one Witness WIT 531 where it is included as Chain Content CC in a Witness Chain WC. Response Endpoint REP 535 sends status information to Voting Participant VPAR 101.

In step 9, Response Endpoint REP 535 sends $S_{TG}$(Voting Ticket TKT), Survey Id SID, Sequence SEQ, Partial $S_{TMP}$ (Response Hash RH), Previous Interactive Response Hash PIRH, and Response Queue QUE 536 and Pick and Post PAP 537 portions of Temporary Key Package TKP to Response Queue QUE 536. Response Queue QUE 536 validates $V_{TG}$(Voting Ticket TKT). Response Queue QUE 536 decrypts $D_{QUE-C}$(Response Queue QUE 536 portion of Temporary Key Package TKP), validates the signatures, and uses a D3 portion of $PRIV_{TMP}$ to perform a portion of the signature on the Response Hash RH resulting in Partial $S_{TMP}$(Response Hash RH). Response Queue QUE 536 stores and queues a configurable number of Interactive Response Queue Packages IRQP that are retrieved for delivery to Pick and Post PAP 537 in step 10. A Interactive Response Queue Package IRQP comprises $S_{TG}$(Voting Ticket TKT), Survey Id SID, Sequence SEQ, Partial $S_{TMP}$ (Response Hash RH), Previous Interactive Response Hash PIRH, and Pick and Post PAP 537 portions of Temporary Key Package TKP.

In step 10, Pick and Post PAP 537 requests an Interactive Response Queue Package IRQP from Response Queue QUE 536 for delivery to a Response Bulletin Board Group RBBG comprised of one or more Response Bulletin Boards RBB 538. Response Queue QUE 536 randomly selects a configurable number of Interactive Response Queue Packages IRQP that have not already been posted to the specified Response Bulletin Board Group RBBG with an additional selection factor of a configurable delay as a minimum time between posting and selection. Response Queue QUE 536 retrieves some unique information from each selected Interactive Response Queue Package IRQP and delivers the list of unique information to Pick and Post PAP 537. Pick and Post PAP 537 selects one item in the list of unique information and returns the unique information to Response Queue QUE 536. Response Queue QUE 536 uses the unique information to locate the selected Interactive Response Queue Package IRQP, mark the Interactive Response Queue Package IRQP as provided to Response Bulletin Board Group RBBG, and sends the Interactive Response Queue Package IRQP to Pick and Post PAP 537. In the case that the Interactive Response Queue Package IRQP is found to already have been delivered to Response Bulletin Board Group RBBG, then Pick and Post PAP 537 is directed to make another selection. For each Pick and Post PAP 537 Interactive Response Queue Package IRQP that is selected, Response Queue QUE 536 encrypts $E_{WIT}$($S_{TG}$(Voting Ticket TKT), Pick and Post PAP 537 instance, Response Bulletin Board Group RBBG) and sends to at least one Witness WIT 531 where it is included as Chain Content CC in a Witness Chain WC. After the Interactive Response Queue Package IRQP is delivered to all Response Bulletin Board Groups RBBG, the Interactive Response Queue Package IRQP may be archived for future auditing. Response Queue QUE 536 may not provide information to Pick and Post PAP 537 requests until a configurable number of Interactive Response Queue Packages IRQP have been queued. Pick and Post PAP 537 validates $V_{TG}$(Voting Ticket TKT). Pick and Post PAP 537 decrypts $D_{PAP-C}$(Pick and Post PAP 537 portion of Temporary Key Package TKP), validates the signatures, and uses a D4 portion of $PRIV_{TMP}$ to perform a portion of the signature on the Response Hash RH resulting in $S_{TMP}$ (Response Hash RH). Pick and Post PAP 537 sends $S_{TG}$ (Voting Ticket TKT), Survey Id SID, Sequence SEQ, $S_{TMP}$ (Response Hash RH), and Previous Interactive Response Hash PIRH to a Response Bulletin Board RBB 538 in Response Bulletin Board Group RBBG.

In step 11, Response Bulletin Board RBB 538 validates $V_{TG}$(Voting Ticket TKT), $V_{TMP}$(Response Hash RH), Response Hash RH, and Previous Interactive Response Hash PIRH and checks all information for consistency and correctness. Response Bulletin Board RBB 538 stores $S_{RBB}$ ($S_{TG}$(Voting Ticket TKT), Survey Id SID, Sequence SEQ, $S_{TMP}$(Response Hash RH), and Previous Interactive Response Hash PIRH and adds as Chain Content to Response Chain RC.

Figure 7:
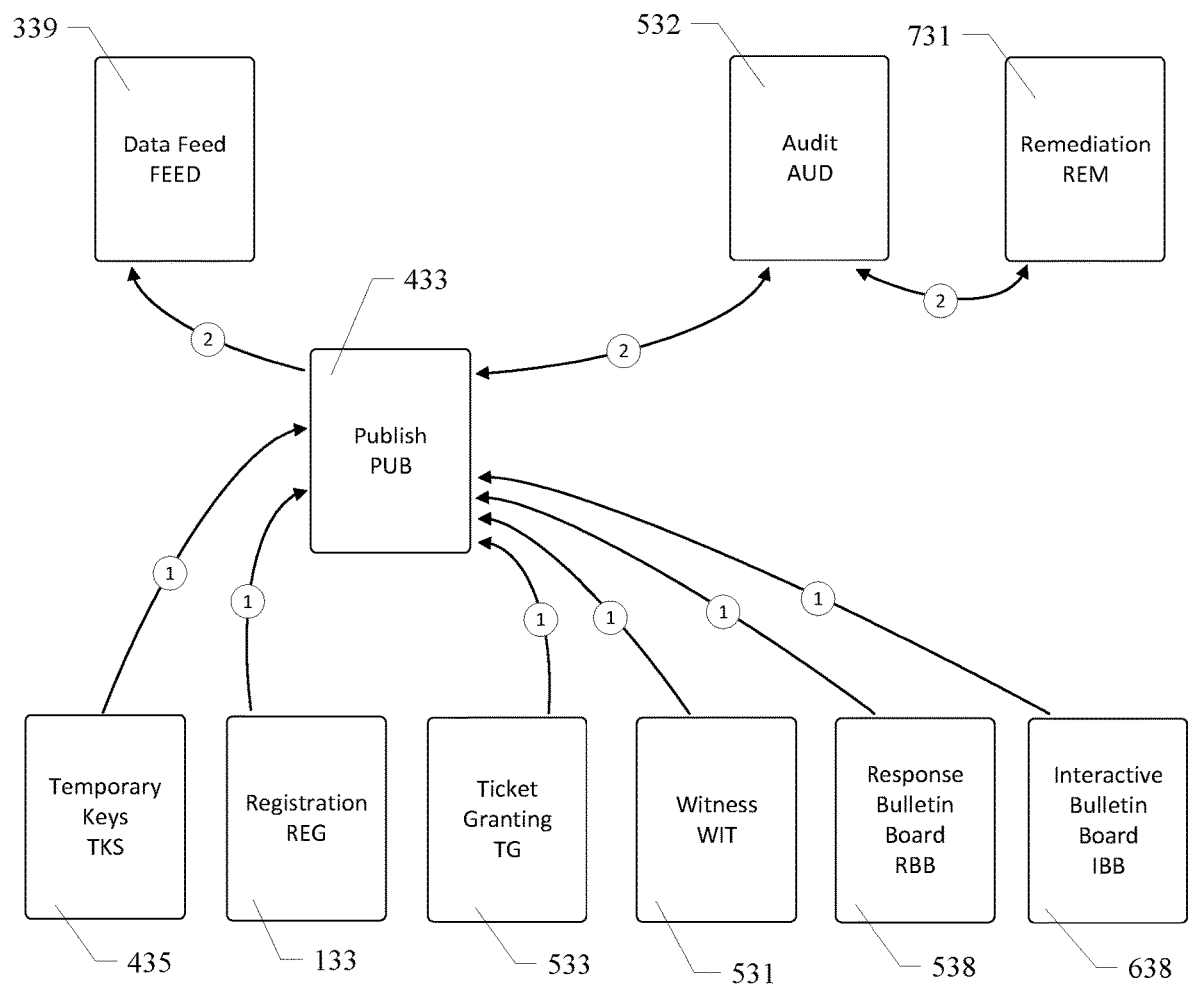
FIG. 7 shows a view of survey finalization and auditing for a system and method for reliable opinion polls according to an embodiment of the disclosed subject matter.

FIG. 7 shows a view of survey finalization and auditing for a system and method for reliable opinion polls. After an opinion poll is closed and all responses have been received, survey and response information is collected, validated, audited, tallied, and the final results are presented. Data collected in the survey process is made available such that third parties can perform independent survey auditing. Although this FIG. describes an embodiment using a single instance of each service, multiple instances of services may be used to accomplish this embodiment. Numbers inside of a circle are included as a convenience to indicate steps in the described protocol. Lines with directional arrows are included to show the flow of information from one step to the next step. These steps and descriptions may have other embodiments that utilize additional or different devices, application servers, application services, steps, dataflow, data types, data parameters, algorithms, key lengths, proofs, and protocols to accomplish a similar outcome.

In step 1, survey, response, and auditing data is collected from services and stored in the publish service in preparation for auditing and archive. Data for Survey Id SID is collected from services such as Temporary Keys 435, Registration 133, Ticket Granting 533, Witness 531, Response Bulletin Board 538, and Interactive Bulletin Board 638 and stored in Publish 433. Data from all primary, secondary, satellites replicas is collected. If third parties have participated in the process, data from third-party instances of services is collected.

In step 2, Audit AUD 532 audits the collected information for accuracy, omissions, and correctness. Data is decrypted and signatures are checked as required. Data from all primary, secondary, satellites replicas is retrieved, combined, de-duplicated, validated, checked, and cross-checked. Data from all third-party instances of services is retrieved, combined, de-duplicated, validated, checked, and cross-Checked. When an opinion poll is an election, any Hardcopy Auditing Response HAR data is retrieved, optionally re-scanned, combined, de-duplicated, validated, checked, and cross-Checked. Chains are checked for validity. Data is checked for inconsistencies. Data of different types are compared for integrity and completeness. Data is checked for errors such as data that has been added, changed, or deleted without authorization. Data is checked for inclusion in the applicable Chains. Tickets TKT are validated to be correctly issued. Invalid or non-matching data and/or responses are removed as possible and marked as invalid. Responses RSP and Interactive Responses IRSP are validated for Survey Id SID and are tallied. If Remediation Mode is enabled for testing, remediation data is sent to Remediation REM 731 for decryption and returned Audit AUD 532 where test participants and test responses are linked, end-to-end response auditing is performed, and the test responses are removed from the results. In an optional embodiment that not shown, if Remediation Mode is enabled for testing, remediation data from Witness WIT 531 may be sent to Audit AUD 532 in substantially real-time such that Audit AUD 532 can tally the test responses and provide substantially real-time test responses totals to Tally TAL 539 so that test response responses can be removed from reported results in substantially real-time. If Remediation Mode is enabled for Voting Participant opt-in, remediation data is sent to Remediation REM 731 for decryption and returned Audit AUD 532 where a Voting Participant and their response is linked, end-to-end response auditing is performed, and the results of the audit are published. If Remediation Mode is enabled for Survey Id SID, remediation data for all Voting Participant responses is sent to Remediation REM 731 for decryption and returned Audit AUD 532 where each Voting Participant and their response are linked, end-to-end response auditing is performed, any fraudulent or inconsistent responses are removed from the results, and the results of the audits are published. Data is prepared for optional risk limited audits performed by third parties. Final survey totals are computed, errors are reported, audit reports are prepared and data sent to Data Feed FEED 339 described in FIG. 4 for purposes of publishing or third-party auditing.

Figure 8:
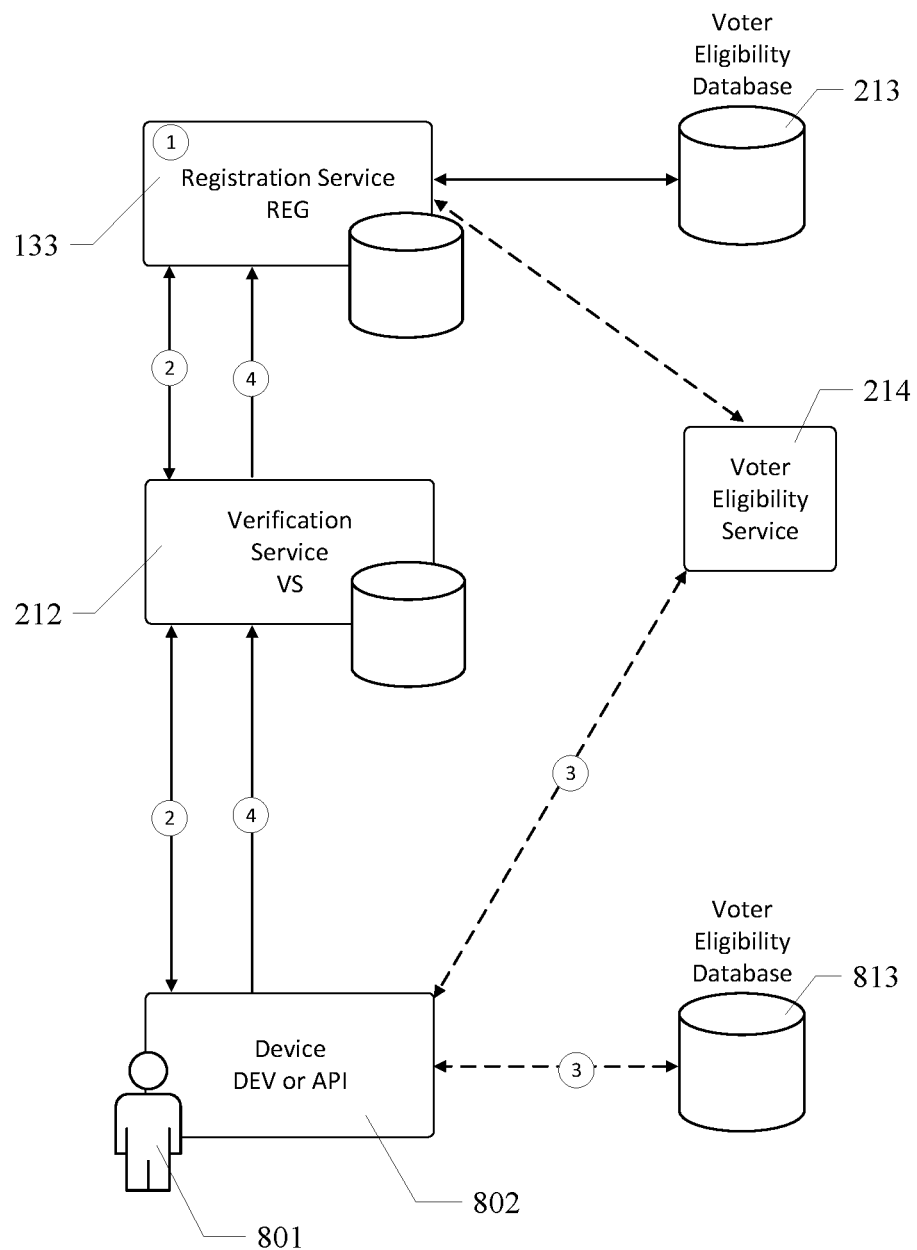
FIG. 8 shows a view of participant verification services for a system and method for reliable opinion polls according to an embodiment of the disclosed subject matter.

FIG. 8 shows a view of participant verification services for a system and method for reliable opinion polls to verify that participants are eligible to participate in surveys and other system functions. This FIG. describes one embodiment of voter eligibility auditing in which the system and/or a third-party can audit the voting participants to determine current voter authorization status. Voting Verification Partner VVP 801 is a Participant PAR 151. Device DEV 802 is a Device DEV 152 and/or a Participant Application Programming Interface PARAPI 153 used by a Voting Verification Partner VVP 801. When an opinion poll is an election, external systems may be used for participant verification. Although this FIG. describes an embodiment using a single instance of each service, multiple instances of services may be used to accomplish this embodiment. Numbers inside of a circle are included as a convenience to indicate steps in the described protocol. Lines with directional arrows are included to show the flow of information from one step to the next step. These steps and descriptions may have other embodiments that utilize additional or different devices, application servers, application services, steps, dataflow, data types, data parameters, algorithms, key lengths, proofs, and protocols to accomplish a similar outcome. Step 1 presents one embodiment of an internal process to verify voter authorization. Step 2 through step 4 present one embodiment of a process in which an external partner verifies voter authorization by performing a risk limiting audit that audits randomly selected samples for correctness and is independent of step 1 verification. Participant and voter verification is performed periodically and is likely to be associated with the periodic updates of information in Voter Eligibility Database 213 or Voter Eligibility Service 214.

In step 1, Registration REG 133 processes voter authorization validation. Registration REG 133 periodically re-validates prior voter authorizations to verify current voter registration status of each Voting Participant VPAR that has been previously qualified as a Voting Participant VPAR. Voting Participant VPAR profile information is retrieved from secure storage and selected information is used to determine participant eligibility as an authorized voter or other authenticated status. Voter Eligibility Database 213 and Voter Eligibility Service 214 provide information that is used by the system to re-validate if a voter should be currently granted rights to express a response to an opinion poll within the context of one or more groups, institutions, organizations, governmental, or political units. Other types of participant information may also be used to search additional internal or external data sources to enhance eligibility determination as a voter or other type of participant. Participant voter registration status and/or credential expiration dates are validated. If these are found to be non-Current, updated credentials and information are requested from the participant. The participant must complete a portion of the onboarding protocol in FIG. 2 to update this information. Registration REG 133 information may be updated and along with date that the participant status has been last validated. Voter Verification VV is constructed for each Voting Participant VPAR 101 using a minimum of information required for voter validation and date of last validation. Voter Verification VV is signed by Registration REG 133 using $PRIV_{REG}$ and encrypted to one or more Voter Verification Partner(s) VVP using a $CERT_{VVP}$. Voter Verification VV is sent to Verification VER 212.

In step 2, Voting Verification Partner VVP 801 uses Device DEV 802 to prepare a request for authorized voter verification. Voting Verification Partner VVP 801 has obtained valid session tokens described in FIG. 3 as a pre-Condition to this process. Voting Verification Partner VVP 801 establishes a session with Verification VER 212 using Session Token STOKEN and request a configurable number of Verification VV records. Verification VER 212 validates the Session Token STOKEN, authenticates the status and access rights of Voting Verification Partner VVP 801, and returns the requested Verification VV records to Voting Verification Partner VVP 801.

In step 3, for each Verification VV returned, Voting Verification Partner VVP 801 decrypts $D_{VVP}$(Verification VV), validates the signature $V_{REG}$(Verification VV), compares the data in Verification VV to Voter Eligibility Database 813 and/or Voter Eligibility Service 214 to determine current authorized voter status.

In step 4, Voting Verification Partner VVP 801 performs $E_{VS}(S_{VVP}$(Verification VV, status, date)) for each record and sends to Verification VER 212. Verification VER 212 performs $D_{VS}(V_{VVP}$(Verification VV, status, date)) for each record and updates Registration REG 133 with verification status and date of validation.

Although example diagrams to implement the elements of the disclosed subject matter have been provided, one skilled in the art, using this disclosure, could develop additional embodiments to practice the disclosed subject matter and each is intended to be included herein.

In addition to the above-described embodiments, those skilled in the art will appreciate that this disclosure has application in a variety of arts and situations and this disclosure is intended to include the same.

What is claimed is:

1. A system for polling a population of people, the system comprising:
   at least one server device configured to communicate over a network with at least one client device under the control of a participant in at least one poll,
   wherein the at least one server device comprises one or more processing devices and a non-transitory computer readable storage medium storing program instructions that are executed by the one or more processing devices, causing the one or more processing devices to implement one or more application services configured to:
   receive, from the at least one client device, a request for a first blinded voting ticket;
   construct a voting ticket for a response to the at least one poll;
   blind the voting ticket using a first blinding factor to create the first blinded voting ticket;
   send, to the at least one client device, the first blinded voting ticket;
   receive, from the at least one client device, a second blinded voting ticket;
   apply a digital signature to the second blinded voting ticket to create a signed second blinded voting ticket;
   send, to the at least one client device, the signed second blinded voting ticket;
   receive, from the at least one client device, a signed first blinded voting ticket;
   unblind the signed first blinded voting ticket using the first blinding factor to reveal a signed voting ticket;
   receive, from the at least one client device, the response to the at least one poll that corresponds to the signed voting ticket,
   wherein the at least one client device comprises one or more processing devices and a non-transitory computer readable storage medium storing program instructions that are executed by the one or more processing devices, causing the one or more processing devices to implement one or more applications configured to:
   send, to the at least one server device, the request for the first blinded voting ticket;
   receive, from the at least one server device, the first blinded voting ticket;
   blind the first blinded voting ticket using a second blinding factor to create the second blinded voting ticket;
   send, to the at least one server device, the second blinded voting ticket;
   receive, from the at least one server device, the signed second blinded voting ticket;
   unblind the signed second blinded voting ticket using the second blinding factor to reveal the signed first blinded voting ticket;
   send, to the at least one server device, the signed first blinded voting ticket; and
   send, to the at least one server device, the response to the at least one poll that corresponds to the signed first blinded voting ticket.

2. The system of claim 1, wherein the at least one poll is an election comprising at least one ballot.

3. The system of claim 2, wherein the election is conducted by a governmental jurisdiction.

4. The system of claim 1, wherein a split-key digital signature having a private key that has been divided into at least two portions is used to validate the response.

5. The system of claim 4, wherein a temporary asymmetric key pair is used to perform the split-key digital signature.

6. The system of claim 1, wherein the participant enables the at least one server device to discover the response of the participant.

7. The system of claim 1, wherein the at least one client device is further configured to send and the at least one server device is further configured to receive at least one participant credential.

8. The system of claim 1, wherein the at least one client device is further configured and the at least one server device is further configured to receive biometric information from the participant.

9. The system of claim 1, wherein the at least one server device is further configured to tally the responses.

10. The system of claim 1, wherein the at least one client device is further configured to send and the at least one server device is further configured to receive participant credentials in the form of quantity, group, unique, or time limited representations of acceptable authentication.

11. The system of claim 1, wherein the at least one client device is further configured to include a representation of the response in the request for the first blinded voting ticket.

12. The system of claim 1, wherein the at least one server device is further configured to send the signed voting ticket to the at least one server device and the at least one server device is further configured to receive the signed voting ticket.

13. A computer-implemented method for polling a population of people, the computer-implemented method comprising:

receiving, by at least one server device configured to communicate over a network with at least one client device under the control of a participant in at least one poll, a request for a first blinded voting ticket from the at least one client device;

constructing, by the at least one server device, a voting ticket for a response to the at least one poll;

blinding, by the at least one server device, the voting ticket using a first blinding factor to create the first blinded voting ticket;

sending, by the at least one server device, the first blinded voting ticket to the at least one client device;

receiving, by the at least one server device, a second blinded voting ticket from the at least one client device;

applying a digital signature, by the at least one server device, to the second blinded voting ticket to create a signed second blinded voting ticket;

sending, by the at least one server device, the signed second blinded voting ticket to the at least one client device;

receiving, by the at least one server device, a signed first blinded voting ticket from the at least one client device;

unblinding, by the at least one server device, the signed first blinded voting ticket using the first blinding factor to reveal a signed voting ticket;

receiving, by the at least one server device, the response to the at least one poll that corresponds to the signed voting ticket;

sending, by the at least one client device, the request for the first blinded voting ticket to the at least one server device;

receiving, by the at least one client device, the first blinded voting ticket from the at least one server device;

blinding, by the at least one client device, the first blinded voting ticket using a second blinding factor to create the second blinded voting ticket;

sending, by the at least one client device, the second blinded voting ticket to the at least one server device;

receiving, by the at least one client device, the signed second blinded voting ticket from the at least one server device;

unblinding, by the at least one client device, the signed second blinded voting ticket using the second blinding factor to reveal the signed first blinded voting ticket;

sending, by the at least one client device, the signed first blinded voting ticket to the at least one server device; and sending, by the at least one client device, the response to the at least one poll that corresponds to the signed first blinded voting ticket to the at least one server device.

14. The computer-implemented method of claim 13, wherein the at least one poll is an election comprising at least one ballot.

15. The computer-implemented method of claim 14, wherein the election is conducted by a governmental jurisdiction.

16. The computer-implemented method of claim 13, wherein a split-key digital signature having a private key that has been divided into at least two portions is used to validate the response.

17. The computer-implemented method of claim 16, wherein a temporary asymmetric key pair is used to perform the split-key digital signature.

18. The computer-implemented method of claim 13, wherein the participant enables the at least one server device to discover the response of the participant.

19. The computer-implemented method of claim 13, wherein the at least one client device is further configured to send and the at least one server device is further configured to receive at least one participant credential.

20. The computer-implemented method of claim 13, wherein the at least one client device is further configured to send and the at least one server device is further configured to receive biometric information from the participant.

21. The computer-implemented method of claim 13, wherein the at least one server device is further configured to tally the responses.

22. The computer-implemented method of claim 13, wherein the at least one client device is further configured to send and the at least one server device Is further configured to receive participant credentials in the form of quantity, group, unique, or time limited representations of acceptable authentication.

23. The computer-implemented method of claim 13, wherein the at least one client device is further configured to include a representation of the response in the request for the first blinded voting ticket.

24. The computer-implemented method of claim 13, wherein the at least one server device is further configured to send the signed voting ticket to the at least one server device and the at least one server device is further configured to receive the signed voting ticket.

* * * * *